United States Patent
Umeya

(10) Patent No.: US 7,583,341 B2
(45) Date of Patent: Sep. 1, 2009

(54) ANISOTROPIC OPTICAL ELEMENT

(75) Inventor: Masanori Umeya, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 429 days.

(21) Appl. No.: 11/414,264

(22) Filed: May 1, 2006

(65) Prior Publication Data

US 2006/0257586 A1 Nov. 16, 2006

(30) Foreign Application Priority Data

May 12, 2005 (JP) ............................. 2005-139448

(51) Int. Cl.
*G02F 1/1335* (2006.01)

(52) U.S. Cl. ...................... 349/117; 349/129

(58) Field of Classification Search .............. 349/56, 349/84, 96, 102, 113, 115

See application file for complete search history.

(56) References Cited

U.S. PATENT DOCUMENTS

| | | | | |
|---|---|---|---|---|
| 4,933,243 A * | 6/1990 | Hara et al. | ...................... | 430/20 |
| 5,064,697 A * | 11/1991 | Takiguchi et al. | ........... | 428/1.26 |
| 5,132,147 A * | 7/1992 | Takiguchi et al. | ......... | 427/393.5 |
| 5,147,682 A * | 9/1992 | Takiguchi et al. | .............. | 427/58 |
| 5,249,070 A * | 9/1993 | Takano | ........................ | 349/136 |
| 5,250,214 A * | 10/1993 | Kanemoto et al. | ...... | 252/299.01 |
| 5,309,264 A * | 5/1994 | Lien et al. | ..................... | 349/143 |
| 5,472,635 A * | 12/1995 | Iida et al. | ..................... | 349/117 |
| 5,479,282 A * | 12/1995 | Toko et al. | ................... | 349/123 |
| 5,621,558 A * | 4/1997 | Shimada et al. | .............. | 349/130 |
| 5,764,328 A * | 6/1998 | Kawada et al. | ............... | 349/173 |
| 5,825,448 A * | 10/1998 | Bos et al. | ..................... | 349/128 |
| 5,831,700 A * | 11/1998 | Li et al. | .......................... | 349/88 |
| 5,855,971 A * | 1/1999 | Kobori et al. | ................. | 428/1.2 |
| 5,877,831 A * | 3/1999 | Leenhouts et al. | ........... | 349/113 |
| 5,883,685 A * | 3/1999 | Mazaki et al. | ............... | 349/117 |
| 5,943,110 A * | 8/1999 | Yoda et al. | ..................... | 349/134 |
| 6,051,289 A * | 4/2000 | Tsujimoto et al. | ........... | 428/1.31 |
| 6,074,708 A * | 6/2000 | Onishi et al. | .................. | 428/1.1 |
| 6,108,064 A * | 8/2000 | Minoura et al. | .............. | 349/130 |
| 6,124,913 A * | 9/2000 | Mazaki et al. | ............... | 349/117 |
| 6,156,232 A * | 12/2000 | Shashidhar et al. | ....... | 252/299.4 |
| 6,215,539 B1* | 4/2001 | Schadt et al. | ................ | 349/124 |
| 6,300,991 B1* | 10/2001 | Schadt et al. | ................ | 349/124 |
| 6,375,327 B2* | 4/2002 | Holman et al. | ................ | 353/20 |
| 6,469,683 B1* | 10/2002 | Suyama et al. | ................ | 345/32 |
| 6,495,221 B1* | 12/2002 | Ogawa et al. | ............... | 428/1.23 |

(Continued)

FOREIGN PATENT DOCUMENTS

CN 1412612 A 4/2003

(Continued)

*Primary Examiner*—Frank G Font
*Assistant Examiner*—Peter Radkowski
(74) *Attorney, Agent, or Firm*—Oliff & Berridge, PLC

(57) ABSTRACT

The present invention provides an anisotropic optical element having optical properties that are anisotropic with respect to a direction of a normal to an element plane, being capable of preventing a projection screen or the like from mirroring a light source. The anisotropic optical element includes an oriented cholesteric liquid crystalline reflective layer made from a polymerizable cholesteric liquid crystal. A mean direction of directions of helical axes (main direction of helical axes) in liquid crystal domains of the liquid crystalline structure of the cholesteric liquid crystalline reflective layer is tilted at a predetermined angle with respect to a direction of a normal to the layer plane.

12 Claims, 11 Drawing Sheets

U.S. PATENT DOCUMENTS

| | | | |
|---|---|---|---|
| 6,520,643 B1* | 2/2003 | Holman et al. | 353/20 |
| 6,572,939 B2* | 6/2003 | Kwon et al. | 428/1.2 |
| 6,580,483 B2* | 6/2003 | Suzuki et al. | 349/115 |
| 6,608,661 B1* | 8/2003 | Schadt et al. | 349/124 |
| 6,618,104 B1* | 9/2003 | Date et al. | 349/86 |
| 6,628,369 B2* | 9/2003 | Kumagai et al. | 349/194 |
| 6,671,019 B1* | 12/2003 | Petschek et al. | 349/129 |
| 6,682,786 B1* | 1/2004 | Lien et al. | 428/1.21 |
| 6,690,441 B2* | 2/2004 | Moriya | 349/130 |
| 6,750,941 B2* | 6/2004 | Satoh et al. | 349/201 |
| 6,781,657 B1* | 8/2004 | Kim et al. | 349/129 |
| 6,781,664 B1* | 8/2004 | Heckmeier et al. | 349/181 |
| 6,876,419 B2* | 4/2005 | Kim et al. | 349/129 |
| 6,894,749 B2* | 5/2005 | Suzuki et al. | 349/113 |
| 6,977,700 B2* | 12/2005 | Uesaka et al. | 349/114 |
| 6,982,774 B1* | 1/2006 | Nomura et al. | 349/129 |
| 7,006,180 B2* | 2/2006 | Suzuki et al. | 349/113 |
| 7,014,892 B2* | 3/2006 | Nam et al. | 428/1.2 |
| 7,038,750 B2* | 5/2006 | Nomura et al. | 349/129 |
| 7,106,402 B2* | 9/2006 | Suzuki et al. | 349/113 |
| 7,113,240 B2* | 9/2006 | Takeda et al. | 349/138 |
| 7,182,885 B2* | 2/2007 | Lietzau et al. | 252/299.62 |
| 7,209,097 B2* | 4/2007 | Suyama et al. | 345/32 |
| 7,212,270 B2* | 5/2007 | Takatori et al. | 349/144 |
| 7,307,683 B2* | 12/2007 | Nomura et al. | 349/129 |
| 7,327,432 B2* | 2/2008 | Skjonnemand | 349/168 |
| 7,345,666 B2* | 3/2008 | Kubo et al. | 345/89 |
| 7,416,683 B2* | 8/2008 | Fujisawa et al. | 252/299.1 |
| 2002/0001109 A1* | 1/2002 | Hamano et al. | 359/9 |
| 2002/0018164 A1* | 2/2002 | Ko et al. | 349/129 |
| 2002/0067450 A1* | 6/2002 | Moriya | 349/129 |
| 2002/0075434 A1* | 6/2002 | Jiang et al. | 349/129 |
| 2002/0101560 A1* | 8/2002 | Satoh et al. | 349/201 |
| 2003/0071960 A1 | 4/2003 | Umeya | |
| 2003/0104145 A1* | 6/2003 | Ogawa et al. | 428/1.23 |
| 2003/0222243 A1* | 12/2003 | Lietzau et al. | 252/299.61 |
| 2004/0051831 A1* | 3/2004 | Su Yu et al. | 349/117 |
| 2004/0156001 A1* | 8/2004 | Moriya | 349/117 |
| 2004/0233362 A1* | 11/2004 | Kashima | 349/117 |
| 2004/0239850 A1* | 12/2004 | Kim | 349/117 |
| 2004/0252373 A1 | 12/2004 | Umeya | |
| 2005/0151908 A1* | 7/2005 | Nomura et al. | 349/136 |
| 2005/0151915 A1* | 7/2005 | Nomura et al. | 349/141 |
| 2006/0257589 A1* | 11/2006 | Hayashi et al. | 428/1.2 |

FOREIGN PATENT DOCUMENTS

| | | |
|---|---|---|
| CN | 1435717 A | 8/2003 |
| CN | 1573526 A | 2/2005 |
| JP | A 2003-029254 | 1/2003 |
| JP | A 2005-003823 | 1/2005 |

* cited by examiner

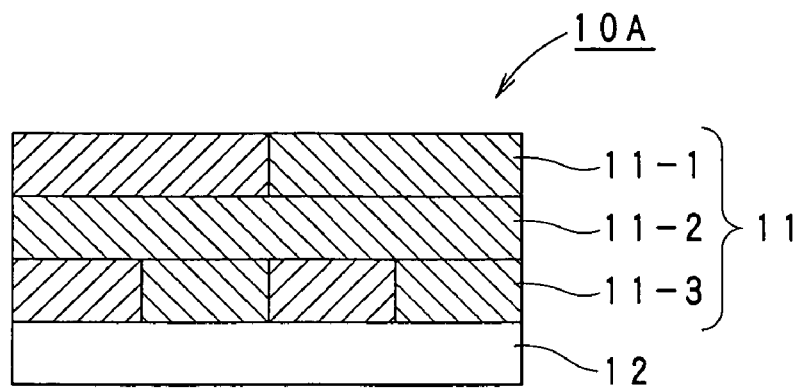
F I G . 1 1
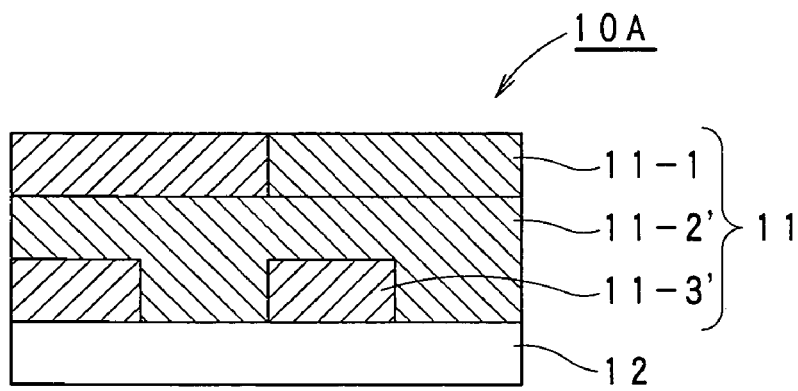
F I G . 1 2 A
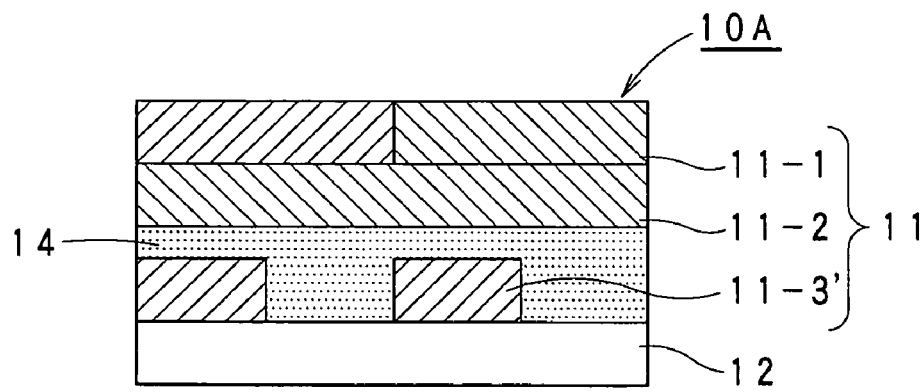
F I G . 1 2 B

ANISOTROPIC OPTICAL ELEMENT

BACKGROUND OF THE INVENTION

1. Field of the Invention

The present invention relates to an optical element comprising a liquid crystalline polymer whose molecules are oriented, and, more particularly, to an anisotropic optical element having anisotropic optical properties with respect to a direction of a normal to an element plane, and to an optical article including the anisotropic optical element, such as a projection screen or a decorative article.

2. Background Art

Optical elements comprising liquid crystalline polymers of such liquid crystals as cholesteric, nematic, or discotic liquid crystals have been generally known as optical elements of the above-described type. These optical elements function as reflecting elements, optical compensation elements, optical retardation elements, etc., and are used as optical components for liquid crystal panel displays, security appliances, optical-measuring devices, optics, liquid crystal projectors, rear projection televisions, projection screens, and so on.

Of these optical elements, optical elements comprising cholesteric liquid crystals typically function as reflecting elements that reflect a specific component of a polarized light owing to the liquid crystalline structures (helical structures) of the cholesteric liquid crystals. For example, in liquid crystal panel displays, such reflecting elements are used as optical components such as polarized-light-separating reflecting elements, color filters, and negative C plate optical compensation elements. Further, in projection screens on which an image light is projected from a projector, such reflecting elements are used as polarization screens that reflect only a specific polarized component of the image light (see Japanese Patent Laid-Open Publication No. 2005-003823.).

In an optical element comprising a cholesteric liquid crystal as described above, directions of helical axes or a mean direction of the directions of helical axes (a main direction of helical axes) in the liquid crystalline structure (helical structure) of the cholesteric liquid crystal has been perpendicular to an element plane, and optical properties of the optical element have therefore been isotropic with respect to a direction of a normal to the element plane.

SUMMARY OF THE INVENTION

However, in the above-described projection screens and liquid crystal panel displays, anisotropic optical properties have been demanded in an increasing number of cases in recent years. Specifically, a possible example of such cases is that, in a projection screen, an angle at which an image light emerges as a reflected light from the projection screen and another angle at which the image light emerges as an interfacial-reflected light from the projection screen are made different from each other so that mirroring of a light source is not recognized by viewers.

The present invention was accomplished in the light of the above-described point. An object of the present invention is, therefore, to provide an anisotropic optical element having optical properties that are anisotropic with respect to a direction of a normal to an element plane, being capable of effectively preventing a projection screen or the like from mirroring a light source, being useful also for cards, posters, and decorative components such as decorative components for furniture or electric appliances; and to provide an optical article including the anisotropic optical element, such as a projection screen or a decorative component.

An anisotropic optical element according to the present invention, having optical properties that are anisotropic with respect to a direction of a normal to an element plane, comprises an oriented cholesteric liquid crystal layer made from a polymerizable cholesteric liquid crystal, formed to have a flat layer plane, a main direction of helical axes, defined as a mean direction of directions of helical axes in liquid crystal domains of the cholesteric liquid crystal layer, being tilted at a predetermined angle with respect to a direction of a normal to the layer plane.

In the anisotropic optical element according to the present invention, it is preferable to make different from each other main directions of helical axes in at least two of a plurality of sections of the layer plane of the cholesteric liquid crystal layer plane so that the layer plane has a predetermined anisotropic pattern.

In addition, in the anisotropic optical element according to the present invention, portions of the cholesteric liquid crystal layer that correspond to specified areas of the layer plane may be removed so that the layer plane has a predetermined configurational pattern.

Furthermore, in the anisotropic optical element according to the present invention, it is preferred that the cholesteric liquid crystal layer be composed of a laminate of a plurality of constituent layers. In this case, main directions of helical axes in at least two of the plurality of constituent layers may be either different from each other or identical.

Furthermore, in the anisotropic optical element according to the present invention, it is preferable to make different from each other main directions of helical axes in at least two of a plurality of sections of the layer plane of each constituent layer of the cholesteric liquid crystal layer so that the layer plane has a predetermined anisotropic pattern. In this case, it is preferred that the anisotropic patterns of at least two of the constituent layers of the cholesteric liquid crystal layer be different from each other.

Furthermore, in the anisotropic optical element according to the present invention, portions of each constituent layer of the cholesteric liquid crystal layer that correspond to specified areas of the layer plane may be removed so that the layer plane has a predetermined configurational pattern. In this case, it is preferred that the configurational patterns of at least two of the constituent layers of the cholesteric liquid crystal layer be different from each other.

Furthermore, in the anisotropic optical element according to the present invention, it is preferred that directions of helical axes in liquid crystal domains of the cholesteric liquid crystal layer be varied relative to the main direction of helical axes within a predetermined range.

A projection screen or a decorative component according to the present invention comprises the above-described anisotropic optical element of the present invention.

According to the present invention, since the oriented cholesteric liquid crystal layer comprising a polymerizable cholesteric liquid crystal is formed so that the mean direction of the directions of helical axes (the main direction of helical axes) in the liquid crystal domains of the liquid crystal layer is tilted at a predetermined angle relative to the direction of the normal to the layer plane, it can impart, to the optical element, anisotropic optical properties that are anisotropic relative to the direction of the normal to the element plane. For this reason, even when such a cholesteric liquid crystal layer is incorporated, as a reflecting element, in a projection screen or the like, it causes cholesteric reflection and interfacial reflection in different directions, so that an image light projected from a projector and reflected by cholesteric reflection, and another image light projected from the projector and reflected by interfacial reflection are never overlapped. Therefore, it becomes possible to avoid the mirroring of a light source that is caused by interfacial reflection, even if the surface of the cholesteric liquid crystal layer is kept smooth without being matted, so that viewers can thus view a bright image with high visibility.

BRIEF DESCRIPTION OF THE DRAWINGS

FIG. 11 is a diagrammatic sectional view showing yet another modification of the decorative component using an anisotropic optical element according to an embodiment of the present invention;

FIGS. 12A and 12B are diagrammatic sectional views showing further modifications of the decorative component using an anisotropic optical element according to an embodiment of the present invention;

EMBODIMENTS FOR CARRYING OUT THE INVENTION

Embodiments of the present invention will be described hereinafter with reference to the accompanying drawings.

Figure 1:
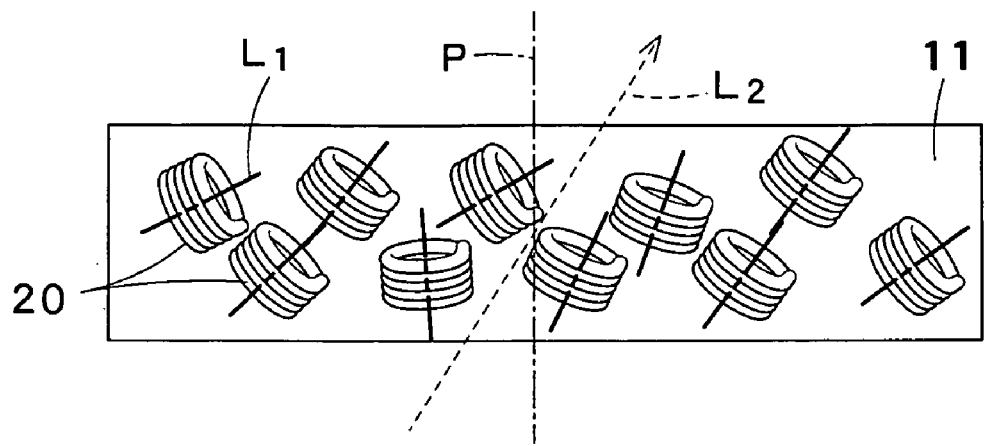
FIG. 1A is a diagrammatic sectional view showing an anisotropic optical element according to an embodiment of the present invention.
FIGS. 1B and 1C are diagrammatic sectional views showing two conventional isotropic optical elements for comparison.
Figure 1:
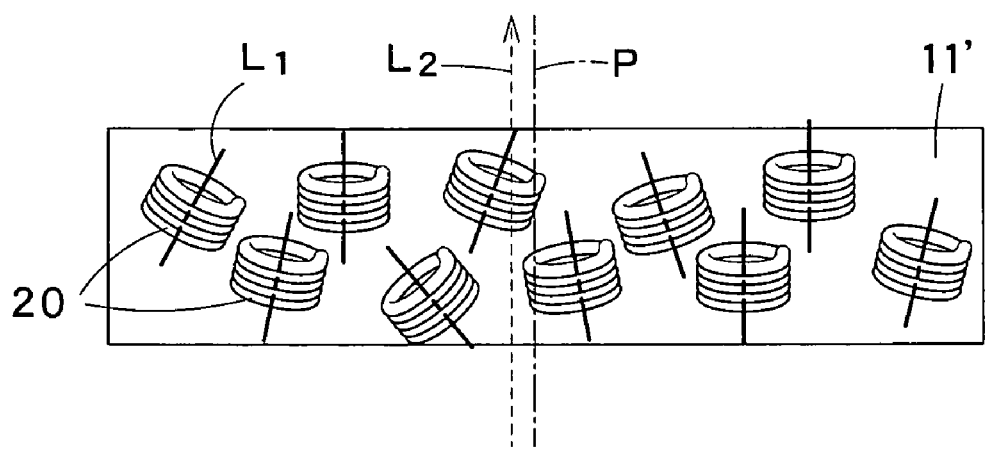
Figure 1:
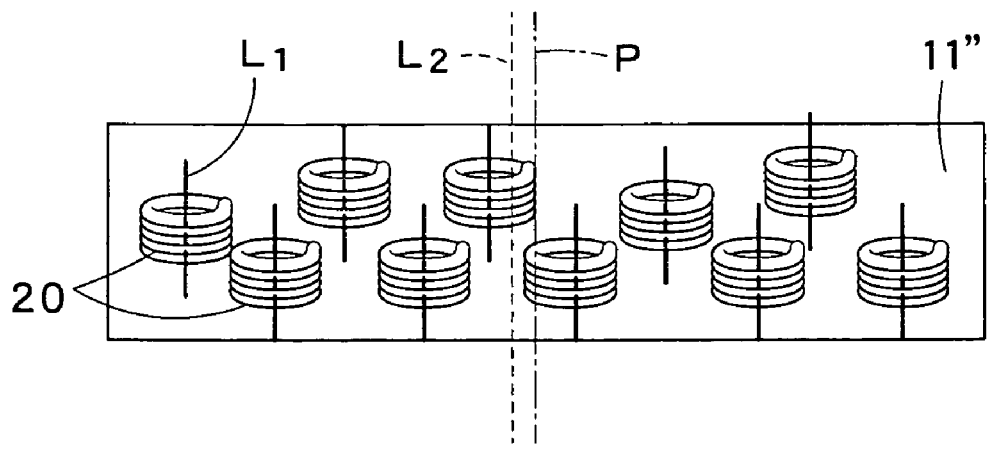

With reference to FIGS. 1A to 1C, an anisotropic optical element according to an embodiment of the present invention will be firstly described by comparing it with two conventional isotropic optical elements. This embodiment will be described by taking, as an example of the anisotropic optical element, a reflecting element that is incorporated in a projection screen or the like so as to reflect a specific polarized-light component.

As shown in FIG. 1A, the anisotropic optical element according to the present embodiment comprises a cholesteric liquid crystalline reflective layer 11 that reflects a specific polarized-light component.

The cholesteric liquid crystalline reflective layer 11 consists of a radiation-polymerizable cholesteric liquid crystal, and liquid crystalline structure of the liquid crystal is helical one formed (molecularly oriented) by continuous rotation, in a direction of layer thickness, of the director of liquid crystalline molecules.

Owing to such a physical arrangement of molecules, the cholesteric liquid crystalline reflective layer 11 has polarized-light-separating properties, the property of separating a component circularly polarized in one direction from a component circularly polarized in the opposite direction. Namely, the cholesteric liquid crystalline reflective layer 11 splits an unpolarized light entering the layer along helical axis into two lights in two different states of polarization (right-handed circularly polarized light and left-handed circularly polarized light), and transmits one of these lights and reflects the other. This phenomenon is known as circular dichroism. If the direction of helical turn in the liquid crystalline helical structure is properly selected, a component circularly polarized in the same direction as this direction of helical turn is selectively reflected.

As shown in FIG. 1A, the cholesteric liquid crystalline reflective layer 11 is formed to have a flat layer plane and is made in such a manner that a mean direction of directions $L_1$ of helical axes (a main direction $L_2$ of helical axes) in liquid crystal domains 20 in the liquid crystalline structure of this layer (a direction of a normal to the Bragg reflective surface) is tilted at a predetermined angle relative to a direction P of a normal to the layer plane. Thus, since the main direction $L_2$ of helical axes in the liquid crystalline structure is tilted at a predetermined angle relative to the direction P of the normal to the layer plane, there can be obtained optical properties that are anisotropic relative to the direction of the normal to the element plane.

Further, the directions $L_1$ of helical axes in the liquid crystal domains 20 of the liquid crystalline structure of the cholesteric liquid crystalline reflective layer 11 are so made that they are varied within a certain range centering around the main direction $L_2$ of the helical axes. By so varying the directions $L_1$ of helical axes in the liquid crystal domains 20 of the liquid crystalline structure, it is possible to diffuse light that is selectively reflected. Owing to the variations in the directions of helical axes in the liquid crystal domains 20 of the liquid crystalline structure, the cholesteric liquid crystalline reflective layer 11 diffuses light that is selectively reflected, so that it can reflect a specific polarized-light component while diffusing it and transmit the other light without diffusing it. For this reason, an environmental light and an imaging light that pass through the cholesteric liquid crystalline reflective layer 11 do not undergo so-called depolarization, disturbance of the state of polarization, and it is therefore possible to increase image visibility, while retaining the polarized-light separating properties that the cholesteric liquid crystalline reflective layer 11 originally has.

The cholesteric liquid crystalline reflective layer 11 having the above-described structure is, as will be described later, formed by applying a cholesteric liquid crystal to a flat substrate and then causing a phase transition to a cholesteric phase of the cholesteric liquid crystal by applying thermal energy or the like to the liquid crystal. In this process, if a surface of the substrate to which the liquid crystal is applied has no aligning (orienting) power (ability), the directions $L_1$ of helical axes in the liquid crystal domains 20 of the liquid crystalline structure vary within a certain range centering around the main direction $L_2$ of the helical axes, as shown in FIG. 1A, and the cholesteric liquid crystalline reflective layer 11 exhibits diffuse-reflecting properties (self-diffusing properties), the property of diffusing light that is selectively reflected. Although not shown in the figure, when the surface of the substrate has aligning power owing to an alignment film or the like formed thereon, the cholesteric liquid crystalline reflective layer is brought to a state of planar orientation, in which all of the directions $L_1$ of helical axes in the liquid crystal domains 20 of the liquid crystalline structure are perpendicular to the layer plane. The cholesteric liquid crystalline reflective layer therefore exhibits specular-reflecting properties, the property of specularly reflecting light that is selectively reflected.

Conventional cholesteric liquid crystalline reflective layers 11' and 11", in which a mean direction of directions $L_1$ of helical axes (a main direction $L_2$ of helical axes) in the liquid crystal domains 20 of the liquid crystalline structure is not tilted relative to the direction P of the normal to the layer plane, will now be described for comparison.

FIG. 1B shows a liquid crystalline structure of a conventional cholesteric liquid crystalline reflective layer 11' formed on a substrate whose surface, to which a liquid crystal is applied, has no aligning power. In this case, directions $L_1$ of helical axes in liquid crystal domains 20 in the cholesteric liquid crystalline reflective layer 11' vary within a certain range centering around a main direction $L_2$ of the helical axes, and the cholesteric liquid crystalline reflective layer 11' thus exhibits self-diffusing properties. On the other hand, when the substrate has, on its surface, an alignment (orientation) film or the like and therefore has some aligning power, the liquid crystalline molecules are brought to a state of planar orientation, in which all of the directions $L_1$ of helical axes in the liquid crystal domains 20 are perpendicular to the layer plane, as in a cholesteric liquid crystalline reflective layer 11" shown in FIG. 1C, and a liquid crystalline layer formed on such a substrate exhibits specular-reflecting properties, the property of specularly reflecting light that is selectively reflected.

In the liquid crystal structures of the cholesteric liquid crystalline reflective layers 11', 11" shown in FIGS. 1B and 1C, the mean direction of the directions $L_1$ of helical axes (the main direction $L_2$ of helical axes) in the liquid crystal domains 20 agrees with the direction P of the normal to the layer plane, unlike the liquid crystalline structure of the cholesteric liquid crystalline reflective layer 11 shown in FIG. 1A. The optical properties of these cholesteric liquid crystalline reflective layers 11', 11" are not anisotropic but isotropic.

Figure 2A:
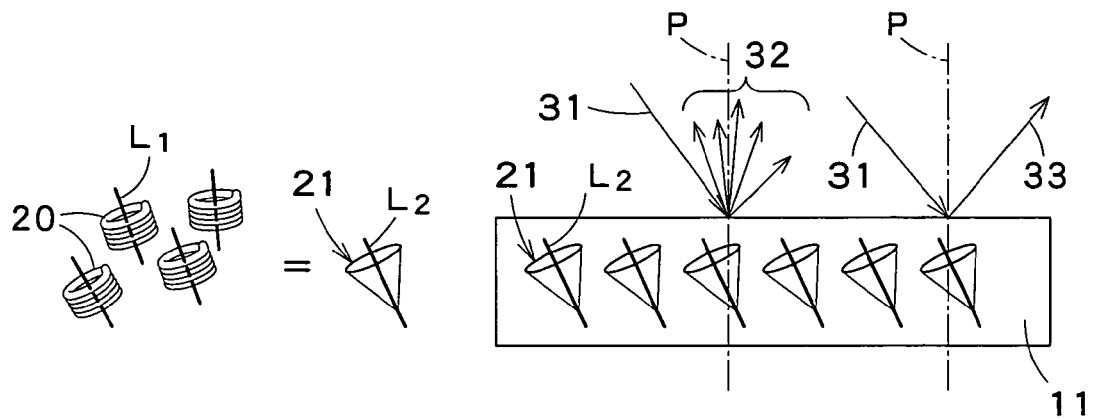
FIG. 2A is an illustration for explaining a function of the anisotropic optical element shown in FIG. 1A.
Figure 2B:
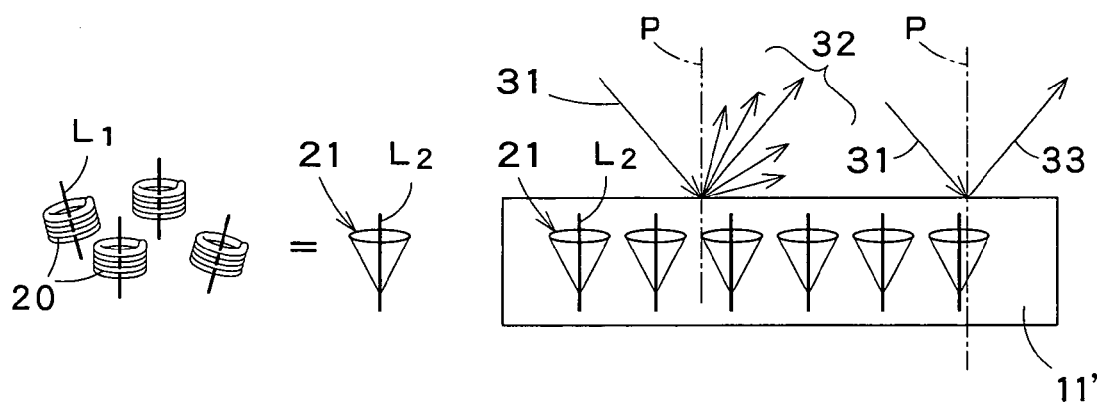
FIG. 2B is an illustration for explaining a function of the anisotropic optical element shown in FIG. 1B.
Figure 2C:
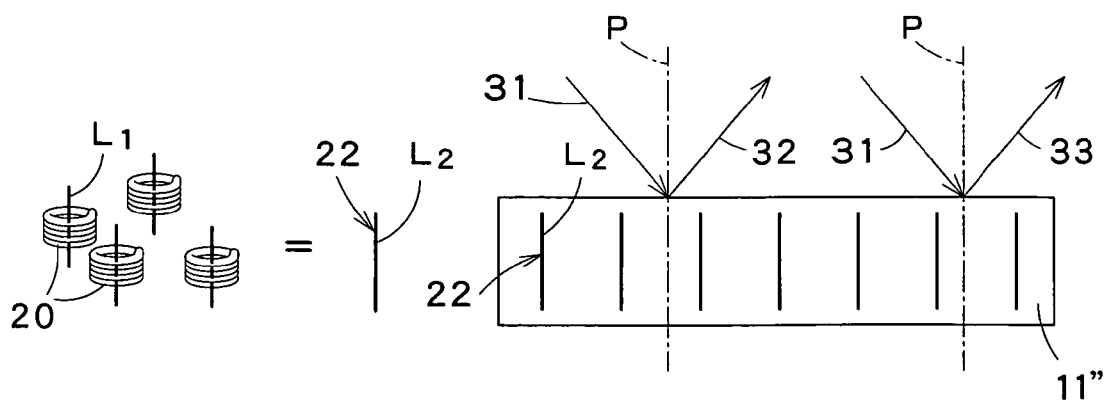
FIG. 2C is an illustration for explaining a function of the anisotropic optical element shown in FIG. 1C.

Next, a function of the cholesteric liquid crystalline reflective layer 11 shown in FIG. 1A, and those of the cholesteric liquid crystalline reflective layers 11', 11" shown in FIGS. 1B and 1C will be described with reference to FIGS. 2A to 2C. In FIGS. 2A to 2C, a collection (aggregation) 21, 22 of liquid crystal domains diagrammatically shows the directions $L_1$ of helical axes in a plurality of the liquid crystal domains 20 and variations of the directions $L1$, and the longitudinal axis of the collection 21, 22 corresponds to the main direction $L_2$ of the helical axes. Herein, the variations in the directions $L_1$ of helical axes in the liquid crystal domains 20 are shown by a cone. That is, a case wherein there are variations in the directions $L_1$ of the helical axes (a case of diffuse reflection) is shown by a cone with a circular base area that corresponds to a degree of the variations (see the reference numeral 21). On the other hand, a case wherein there are no variations in the directions $L_1$ of the helical axes (a case of specular reflection) is shown ideally by a line with no circular base area (see the reference numeral 22).

As shown in FIG. 2A, in the cholesteric liquid crystalline reflective layer 11 shown in FIG. 1A, the mean direction of the directions $L_1$ of helical axes (the main direction $L_2$ of helical axes) in the liquid crystal domains 20 is tilted at a predetermined angle relative to the direction P of the normal to the layer plane, and, at the same time, the directions $L_1$ of helical axes in the liquid crystal domains 20 vary within a certain range centering around the main direction $L_2$ of the helical axes. For this reason, the liquid crystal domains 20 selectively reflect a part of an incident light 31 incident on the cholesteric liquid crystalline reflective layer 11. That is, the part of the incident light is reflected, as an emergent light 32, at an angle of reflection different from another angle of reflection that is common when the main direction $L_2$ of the helical axes agrees with the direction P of the normal to the layer plane. The emergent light 32 emerges as a diffused light owing to the variations in the directions $L_1$ of helical axes in the liquid crystal domains 20. Further, another part of the incident light 31 entering the cholesteric liquid crystalline reflective layer 11 is reflected from the surface of this layer by interfacial reflection, and emerges as an interfacial-reflected light 33. The angle of reflection of the emergent light 32 that is selectively reflected from the liquid crystal domains 20 can be freely selected by properly selecting the mean direction of the directions $L_1$ of helical axes (the main direction $L_2$ of helical axes) in the liquid crystal domains 20.

On the other hand, in the cholesteric liquid crystalline reflective layer 11' shown in FIG. 1B, although the directions $L_1$ of helical axes in the liquid crystal domains 20 vary within a certain range centering around the main direction $L_2$ of the helical axes, the mean direction of the directions $L_1$ of helical axes (the main direction $L_2$ of helical axes) in the liquid crystal domains 20 agrees with the direction P of the normal to the layer plane, as shown in FIG. 2(b). For this reason, although, of an incident light 31 entering the cholesteric liquid crystalline reflective layer 11', an emergent light 32 that has been selectively reflected from the liquid crystal domains 20 emerges as a diffused light owing to the variations in the directions $L_1$ of helical axes in the liquid crystal domains 20, a mean angle of reflection of the diffused light is the same as the angle of reflection that is common when the main direction $L_2$ of the helical axes agrees with the direction P of the normal to the layer plane, and is equal to an angle of incidence of the incident light 31. Therefore, the emergent light 32 thus reflected emerges in the same direction as that in which, of the incident light 31 entering the cholesteric liquid crystalline reflective layer 11', the interfacial-reflected light 33 reflected from the surface of the cholesteric liquid crystalline reflective layer 11' by interfacial reflection emerges.

Further, in the cholesteric liquid crystalline reflective layer 11" shown in FIG. 1C, all of the directions $L_1$ of helical axes in the liquid crystal domains 20 are perpendicular to the layer plane, as shown in FIG. 2(c), and agree with the direction P of the normal to the layer plane. For this reason, of an incident light 31 entering the cholesteric liquid crystalline reflective layer 11", an emergent light 32 selectively reflected from the liquid crystal domains 20 is specularly reflected at an angle of reflection equal to an angle of incidence of the incident light 31. Therefore, the emergent light 32 thus reflected emerges in the same direction as that in which, of the incident light 31 entering the cholesteric liquid crystalline reflective layer 11", the interfacial-reflected light 33 reflected from the surface of the cholesteric liquid crystalline reflective layer 11" by interfacial reflection emerges.

In FIGS. 2A to 2C, the interfacial reflection that occurs on the surfaces of the cholesteric liquid crystalline reflective layers 11, 11', and 11" shown in FIGS. 1A to 1C is caused by a difference in refractive index between two media, and is determined by a direction of a medium-medium interface. Therefore, for example, when an incident light is incident on the interface vertically to the same, the light is reflected from the interface in the same vertical direction; and when an incident light is incident on the interface at an angle of 45°, the light is reflected from the interface at an angle of 45°, the same angle as the angle of incidence of the light.

As can be understood from FIGS. 2B and 2C, in the conventional cholesteric liquid crystalline reflective layers 11' and 11" shown in FIGS. 1B and 1C, respectively, a plane perpendicular to the main direction $L_2$ of helical axes in the liquid crystal domains 20 spreads in the same direction as that in which the surface of the cholesteric liquid crystalline reflective layer 11', 11", an interface, spreads. Therefore, the liquid crystalline structure have caused both cholesteric reflection and interfacial reflection, which overlap.

Figure 4:
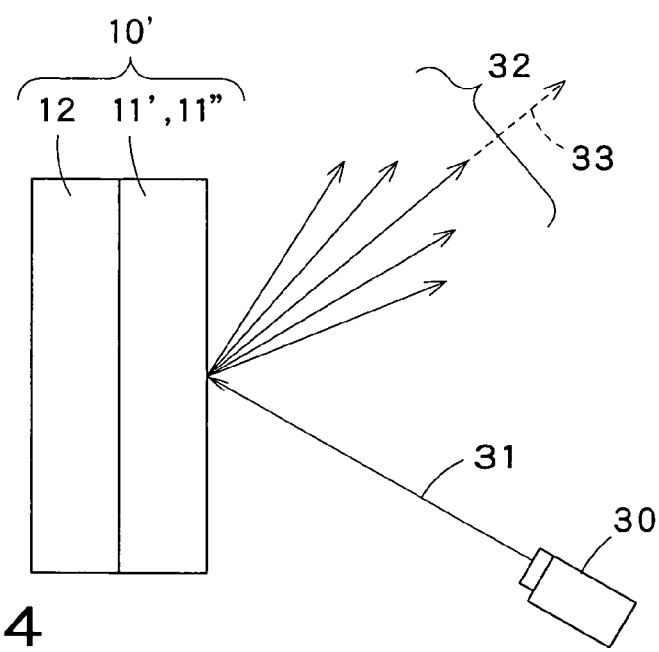
FIG. 4 is a diagrammatic view for explaining a function of a projection screen using, as a reflecting element, a conventional isotropic optical element.

For this reason, for example, when such a cholesteric liquid crystalline reflective layer 11' or 11" is incorporated, as a reflecting element, in a projection screen 10', the cholesteric liquid crystalline reflective layer 11', 11" formed on the substrate 12 causes cholesteric reflection and interfacial reflection in the same direction, as shown in FIG. 4. Therefore, of the image light projected from a projector 30 (incident light 31), the cholesteric-reflected light (emergent light 32) and the interfacial-reflected light 33 are overlapped, and a viewer cannot clearly view an image due to mirroring of the light source caused by the interfacial-reflected light 33. Although it is possible to view the image from a point from which no mirroring of the light source is observed (not a point toward which the interfacial-reflected light 33 mainly travels), only a dark image can be viewed in this case.

One method for solving the above-described problem is that the interfacial-reflected light 33 is eliminated by matting the surface of the cholesteric liquid crystalline reflective layer 11', 11" (imparting roughness to the surface). However, if the surface of the cholesteric liquid crystalline reflective layer 11', 11" is matted, although mirroring of a light source does not occur, directivity for an angle of incidence of an incident light is decreased. Consequently, not only the image light (incident light 31) but also extraneous light such as illumination light is reflected toward the viewer side, which leads to lowering of image contrast in a bright room. Another method is that a roughened layer with lens-shaped regular roughness, or the like is formed on the surface of the cholesteric liquid crystalline reflective layer 11', 11" to let the interfacial-reflected light travel toward the non-viewer side. However, this method is disadvantageous in that the roughened layer produces a stray light and causes hot bands or the like, and that the surface is easily scratched to make the maintenance difficult.

On the other hand, in the cholesteric liquid crystalline reflective layer 11 shown in FIG. 1A, a plane perpendicular to the main direction $L_2$ of helical axes in the liquid crystalline structure spreads in a direction different from the direction in which the surface of the cholesteric liquid crystalline reflective layer 11, as an interface, spreads, as can be understood from FIG. 2A. It is, therefore, possible to make a distinction between cholesteric reflection and interfacial reflection that are caused by the liquid crystalline structure. Further, in the cholesteric liquid crystalline reflective layer 11 shown in FIG. 1A, since diffusibility that is brought about by cholesteric reflection caused by the liquid crystalline structure does not depend on the shape of the surface of the cholesteric liquid crystalline reflective layer 11, it is possible to separately control the diffusibility that is brought about by the cholesteric reflection and diffusibility that is brought about by the interfacial reflection. For this reason, the cholesteric reflection and the interfacial reflection can be freely controlled as follows: the cholesteric reflection is made diffuse reflection, and the interfacial reflection is made specular reflection; on the contrary, the cholesteric reflection is made specular reflection, and the interfacial reflection is made diffuse reflection; or both the cholesteric reflection and the interfacial reflection are made diffuse reflection.

Figure 3:
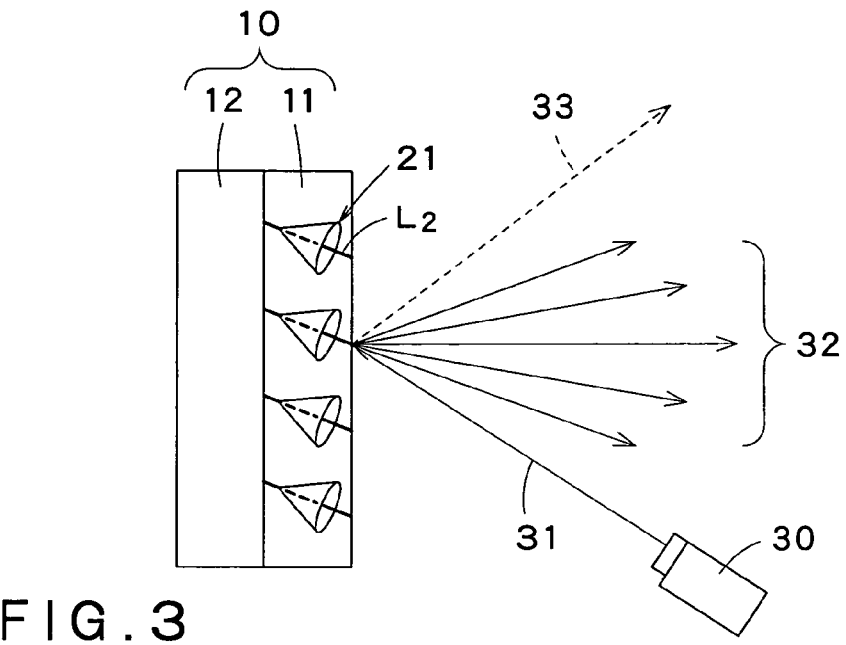
FIG. 3 is a diagrammatic view for explaining a function of a projection screen using, as a reflecting element, the anisotropic optical element shown in FIGS. 1A and 2A.

Therefore, for example, when such a cholesteric liquid crystalline reflective layer 11 is incorporated, as a reflecting element, in a projection screen 10, the cholesteric liquid crystalline reflective layer 11 formed on the substrate 12 causes cholesteric reflection and interfacial reflection in different directions, as shown in FIG. 3, so that, of the image light (incident light 31) projected from a projector 30, the cholesteric-reflected light (emergent light 32) and the interfacial-reflected light 33 are never overlapped. More specifically, as shown in FIG. 3, in a case wherein an image light (incident light 31) is projected by the projector 30 from below the projection screen 10, if the projection screen 10 is set in such a manner that the main direction $L_2$ of helical axes in the liquid crystalline structure of the cholesteric liquid crystalline reflective layer 11 is tilted downwardly relative to the projection screen 10, a viewer who is in front of the projection screen 10 can view the brightest image produced by the cholesteric-reflected light (emergent light 32), and never recognizes the mirroring of the light source caused by the interfacial-reflected light 33. For this reason, even when the surface of the projection screen 10 (cholesteric liquid crystalline reflective layer 11) is kept smooth without being matted, it becomes possible to avoid the mirroring of the light source that is caused by the interfacial-reflected light 33, and a viewer can thus view a bright image with high visibility. In this case, the surface of the projection screen 10 (cholesteric liquid crystalline reflective layer 11) may be slightly matted, and by doing so, it is possible to eliminate mirroring of light other than the image light and thus to view only an image produced by the image light.

Although FIG. 3 shows the case where the main direction $L_2$ of helical axes in the liquid crystalline structure of the cholesteric liquid crystalline reflective layer 11 is in a certain direction (downward) on the projection screen 10 face, the main direction $L_2$ may be controlled according to the position of the projection screen 10 in such a manner that the reflected light is directed to a certain direction. Specifically, for example, if the main direction $L_2$ of helical axes in the liquid crystalline structure of the cholesteric liquid crystalline reflective layer 11 is controlled in such a manner that it tilts toward the center of the projection screen 10 more greatly in an outer peripheral part than in a center part of the surface of the projection screen 10, a light reflected by interfacial reflection 33, which decreases the visibility of a viewed image even at a specific point of observation at which an image light is seen most brightly, travels in a direction different from another direction in which the image light (incident light 31) is reflected. Further, it is possible to increase the intensity of light that is emitted, toward the specific point of observation, from the outer peripheral part of the projection screen 10, which is located in an oblique direction relative to the specific point of observation. The projection screen 10 can thus improve distribution of brightness over the entire surface, to sharply display an image.

The details of the projection screen 10 shown in FIG. 3 will now be described.

As shown in FIG. 3, a projection screen 10 comprises a cholesteric liquid crystalline reflective layer 11, and a substrate 12 that supports the cholesteric liquid crystalline reflective layer 11.

The cholesteric liquid crystalline reflective layer 11 is for reflecting a specific polarized component (e.g., right-handed circularly polarized light) of the image light projected from a projector such as a liquid crystal projector, and, preferably, its liquid crystalline structure has such a specific helical pitch that the layer selectively reflects a light in a specific wave range that covers only a part of the visible light range (e.g., a wave range of 400 to 700 nm). More specifically, it is preferred that the liquid crystalline structure of the cholesteric liquid crystalline reflective layer 11 has at least two discontinuously varied helical pitches so that the layer selectively reflects lights in wave ranges that correspond to wave ranges of the image light projected from a projector such as a liquid crystal projector. A projector usually attains the color display by lights in the wave ranges for the three primary colors of light, that is, red (R), green (G), and blue (B). For example, assuming that a light enters the cholesteric liquid crystalline reflective layer 11 perpendicularly to the same, the helical pitches in the liquid crystalline structure may be determined so that the cholesteric liquid crystalline reflective layer 11 selectively reflects lights with selective reflection center wavelengths present in ranges of 430-460 nm, 540-570 nm, and 580-620 nm.

The ranges of 430-460 nm, 540-570 nm, and 580-620 nm used as the wave ranges for red (R), green (G), and blue (B), respectively, are the usual ones in color filters, light sources, etc., which are used in displays for producing white color by the three primary colors of light. Herein, red (R), green (G), and blue (B) colors are ideally given as line spectra that peak at specific wavelengths (e.g., in a case of green (G), this wavelength is typically 550 nm). However, actually, these line spectra have certain widths, and, moreover, the wavelength varies depending upon design of the unit, type of the light source, and so forth. It is preferred that each wavelength band for each color has a width of 30-40 nm. If the wave ranges for red (R), green (G), and blue (B) colors are set outside the above-described ranges, a display cannot produce desired white color, but unfavorably produces yellowish or reddish white.

In a case where the wave ranges for red (R), green (G), and blue (B) are given as independent selective reflection wave ranges, it is preferred that the liquid crystalline structure of the cholesteric liquid crystalline reflective layer 11 has three discontinuously varied helical pitches. There is a case where the wave ranges for red (R) and green (G) are included in the wavelength band of a selective reflection wave range corresponding to one helical pitch. In this case, it is preferred that the liquid crystalline structure has two discontinuously varied helical pitches.

Figure 5:
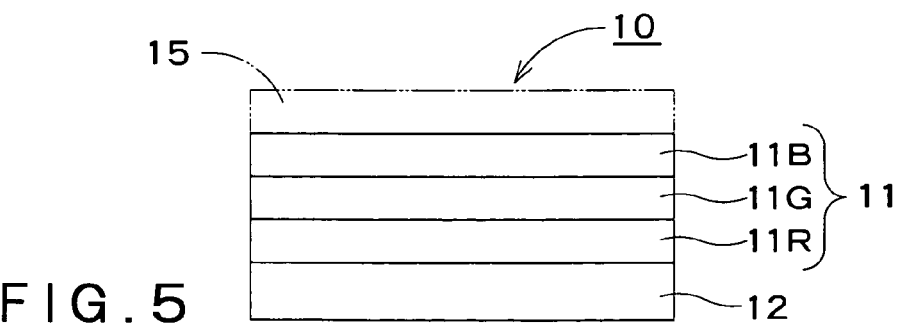
FIG. 5 is a diagrammatic sectional view showing a modification of the projection screen using an anisotropic optical element according to an embodiment of the present invention as a reflecting element.

In order for the liquid crystalline structure of the cholesteric liquid crystalline reflective layer 11 to have two or more discontinuously varied helical pitches, the cholesteric liquid crystalline reflective layer 11 may be composed of a laminate of two or more partial selective reflection layers that are different in helical pitch. Specifically, as shown in FIG. 5, a partial selective reflection layer 11R that selectively reflects a light in the wave range for red (R), a partial selective reflection layer 11G that selectively reflects a light in the wave range for green (G), and a partial selective reflection layer 11B that selectively reflects a light in the wave range for blue (B) may be successively laminated to the substrate 12 in the order mentioned. The order in which the partial selective reflection layers 11R, 11G and 11B are laminated is not limited to the above-described one, and they may be laminated in any other order.

In the projection screen 10 shown in FIG. 5, each partial selective reflection layer 11R, 11G or 11B, constituting the cholesteric liquid crystalline reflective layer 11, may be a laminate of a plurality of reflective layers, at least two of which are different in the main direction of helical axes.

Figure 6A:
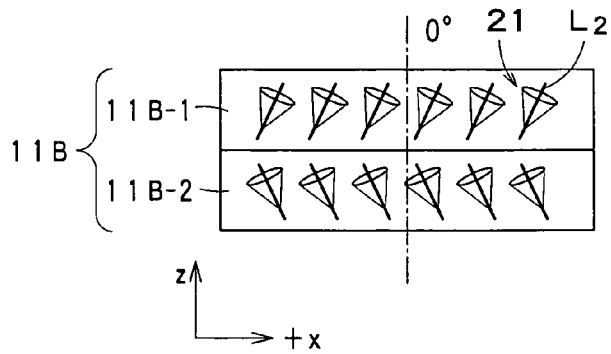
FIGS. 6A to 6E are views and graphs for explaining a case wherein a partial selective reflection layer for each color, constituting the reflecting element used in the projection screen shown in FIG. 5, is composed of a plurality of layers.
Figure 6C:
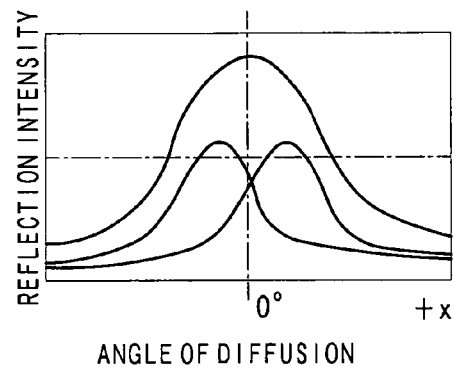
Figure 6B:
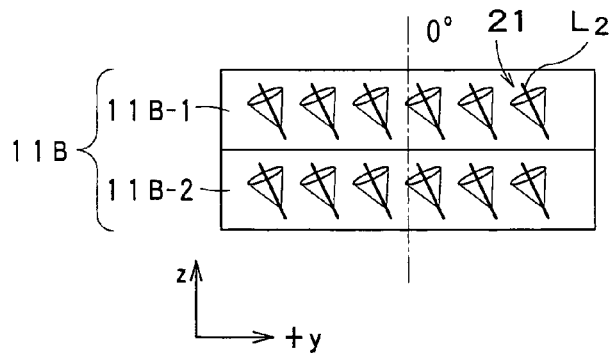
Figure 6D:
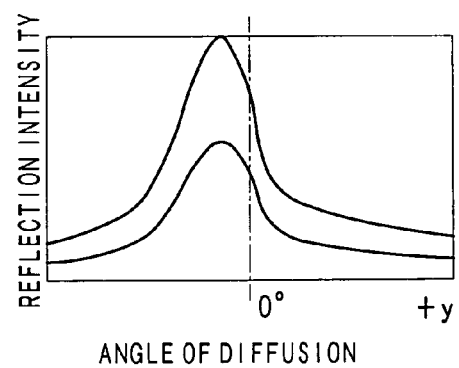
Figure 6E:
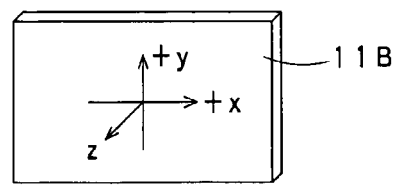

Specifically, for example, in a case of the partial selective reflection layer 11B for selectively reflecting blue, as shown in FIG. 6A, it is proper to laminate a reflective layer 11B-1 for reflecting blue in which the main direction $L_2$ of helical axes in a group of liquid crystal domains 21 is tilted in a lower right direction (+x direction and −y direction) on the viewer side as viewed from the front (+z direction) of the projection screen 10, and a reflective layer 11B-2 for reflecting blue in which the main direction $L_2$ of helical axes in a group of liquid crystal domains 21 is tilted in a lower left direction (−x direction and −y direction) on the viewer side. FIG. 6B shows a comparison composed of two reflective layers 11B-2. FIG. 6E shows the coordinate system of the partial selective reflection layers. 11B (the projection screens 10) shown in FIGS. 6A and 6B. FIGS. 6c and 6d respectively show distributions of reflection intensity on the partial selective reflection layers 11B for reflecting blue, shown in FIGS. 6A and 6B.

Similarly, each of the other partial selective reflection layers for reflecting the other colors (the partial selective reflection layer 11R for reflecting red and the partial selective reflection layer 11G for reflecting green) may also be composed of a laminate of at least two reflective layers that are different in the main direction $L_2$ of helical axes in a group of liquid crystal domains 21.

When the cholesteric liquid crystalline layer is formed as described above, if an image light is projected on the projection screen 10 from below, a light reflected by interfacial reflection (mirroring of the light source) travels above the viewer (+y direction), and the image light itself is reflected toward the viewer (toward the front) (+z direction). In this case, in the two reflective layers (e.g., the reflective layers 11B-1 and 11B-2) constituting respective partial selective reflection layers (e.g., the partial selective reflection layer 11B for reflecting blue), the main directions $L_2$ of helical axes in the groups of liquid crystal domains 21 are tilted in different directions toward left and right (+x direction, −x direction), so that it is possible to separately control the viewing angle on the upper and lower parts and the left- and right-hand parts of the projection screen 10. A viewer can therefore view a relatively bright image even when viewing the image from an oblique direction (+x direction or −x direction).

The above description is for the case where each of the partial selective reflection layers 11R, 11G, and 11B constituting the cholesteric liquid crystalline reflective layer 11 is composed of a laminate of a plurality of reflective layers, at least two of which are different in the main direction $L_2$ of helical axes. The cholesteric liquid crystalline reflection layer 11 is not limited to this. Each of the partial selective reflection layers 11R, 11G, and 11B constituting the cholesteric liquid crystalline reflective layer 11 may be composed of a laminate of a plurality of reflective layers, at least two of which are the same in the main direction $L_2$ of helical axes (see FIG. 6B).

Next, the substrate 12 will be described.

The substrate 12 is for supporting the cholesteric liquid crystalline reflective layer 11, and a substrate in the form of a film or plate made from such a material as a plastic, a metal, paper, cloth, or glass may be used for the substrate 12.

The substrate 12 may contain a light-absorbing layer that absorbs a light in the visible light range. Specifically, for example, the substrate 12 may be an acrylic sheet or a plastic film into which a black pigment is incorporated (e.g., a black PET film in which carbon is incorporated) (in this case, the substrate 12 itself serves as the light-absorbing layer (light-absorbing substrate)), or may be a transparent substrate film such as a plastic film having, on one surface thereof, a light-absorbing layer containing a black pigment or the like. When the substrate 12 is so made, the projection screen 10 absorbs a light that is contained in the unpolarized light entering the projection screen 10 from the viewer side and that should not be reflected as the reflected light 32 (left-handed circularly polarized light in the selective reflection wave range, and right-handed circularly polarized light and left-handed circularly polarized light not in the selective reflection wave range), and a light entering the projection screen 10 from the rear. It is thus possible to effectively prevent the projection screen 10 from reflecting the environmental light such as extraneous light and illumination light, and from producing any stray light from the image light.

Examples of plastic films useful for the material for the substrate 12 are films of thermoplastic polymers including polycarbonate polymers, polyester polymers such as polyethylene terephthalate, polyimide polymers, polysulfone polymers, polyether sulfone polymers, polystyrene polymers, polyolefin polymers such as polyethylene and polypropylene, polyvinyl alcohol polymers, cellulose acetate polymers, polyvinyl. chloride polymers, polyacrylate polymers, and polymethyl methacrylate polymers. The material for the substrate 12 is not limited to the above-described ones, and metals, paper, cloth, glass, and the like may also be used.

The transmittance of the substrate 12 may be freely selected, and the substrate 12 can have any transmittance as long as it remains transparent. Moreover, the color of the substrate 12 may also be freely selected, and the substrate 12 can have any color such as red or blue, as long as it remains transparent.

Next, a method of producing an anisotropic optical element (cholesteric liquid crystalline reflective layer 11) of the above-described construction will be described with reference to FIG. 7.

Figure 7:
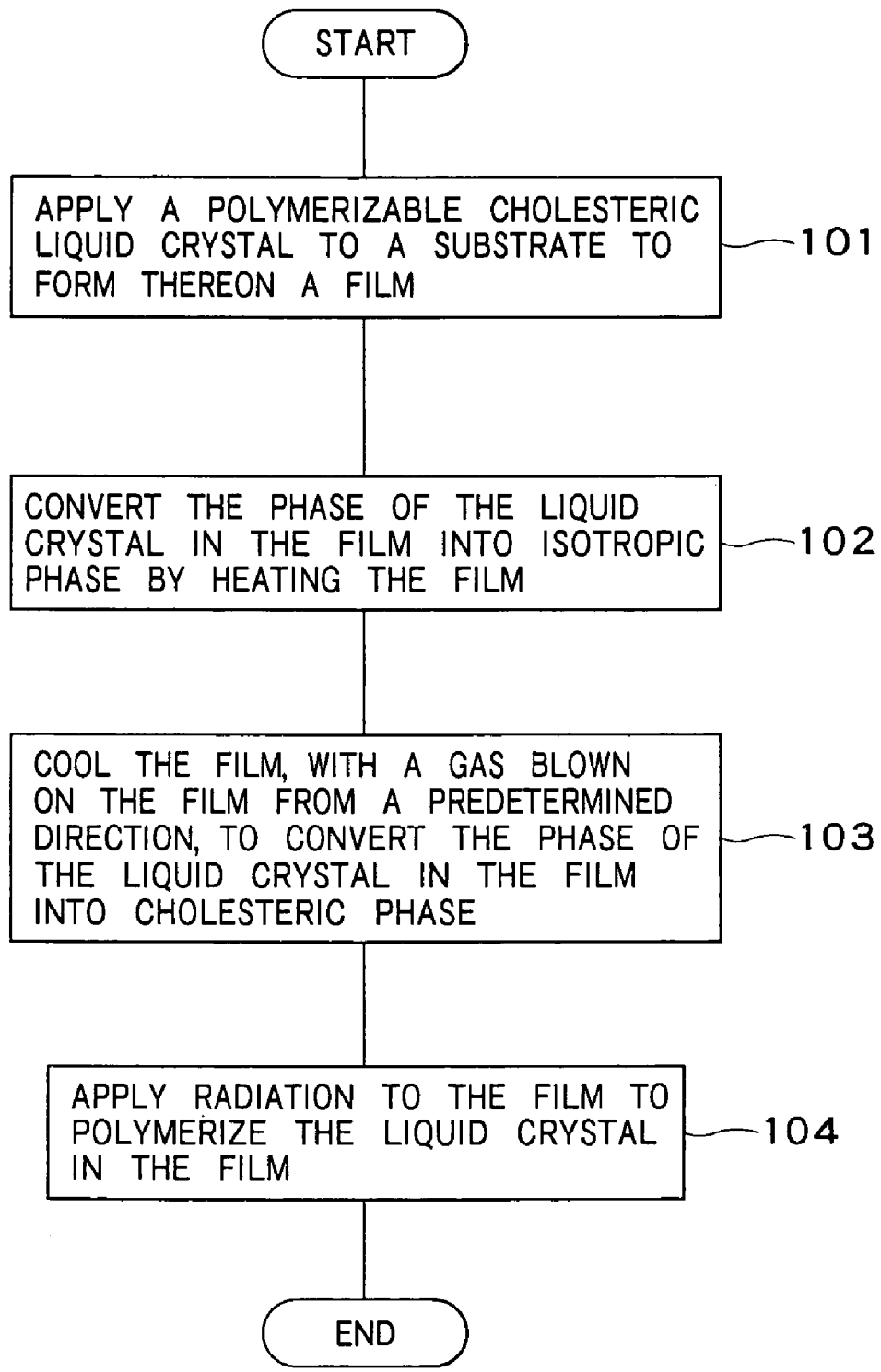
FIG. 7 is a flow chart showing a method of producing an anisotropic optical element according to an embodiment of the present invention.

As shown in FIG. 7, a liquid crystalline composition containing a radiation-polymerizable cholesteric liquid crystal is firstly applied flatwise to a surface of a previously prepared substrate to form thereon an uncured film with a uniform thickness (step 101).

In the above step, any of the existing methods can be employed for the application of the liquid crystalline composition. Specifically, there can be used a spin, blade, slit, or die coating method, for example.

Any substrate with a flat surface can be used as the substrate to which the liquid crystalline composition is applied, and either a film- or sheet-shaped substrate, for example above mentioned one, may be used. Moreover, any material that withstands a heating process (a heating process for converting a phase of the liquid crystalline composition into an isotropic phase), which will be described later, can be used for the substrate, and it is possible to use such a material as a plastic or glass, for example above mentioned one. Aligning power may or may not have been imparted to the surface of the substrate. Aligning power can be imparted to the surface of the substrate by forming an alignment film on the substrate, or by subjecting the surface of the substrate to a rubbing treatment, or by using, as the substrate, a stretched plastic film. On the contrary, an ordinary non-stretched plastic, or a resin film or glass plate that has not been subjected to any rubbing treatment, can be used as the substrate having no aligning power.

Further, a cholesteric chiral nematic liquid crystal or a cholesteric liquid crystal may be used as the liquid crystal to be incorporated in the liquid crystalline composition that is applied to the substrate. Any known liquid crystal can be herein used as the liquid crystal, and it is possible to use the liquid crystals described in the above-described Patent Document (Japanese Patent Laid-Open Publication No. 2005-003823), for example. Although such a liquid crystal may be applied, as it is, to the substrate, it may be dissolved in a proper solvent such as an organic solvent into an ink, in order to make viscosity of the liquid crystal fit the applicator and to obtain an excellent state of orientation. When a liquid crystal is used as it is, since viscosity of the liquid crystal is high, it is preferable to heat the liquid crystal until the phase of the liquid crystal becomes approximately isotropic, for example, to increase fluidity of the liquid crystal. The liquid crystal for use herein has a first phase transition temperature (e.g., 90° C.) that is a transition point at which a transition from a cholesteric phase to an isotropic phase on a higher-temperature side occurs, and a second phase transition temperature (e.g., 70° C.) that is a transition point at which a transition from the cholesteric phase to a phase on a lower-temperature side (nematic phase, smectic phase, etc.) occurs.

Next, the uncured film formed on the substrate is heated to a temperature equal to or more than the first phase transition temperature, thereby the phase of the liquid crystal in the film is converted into an isotropic phase (step 102). In this step, although the temperature at which the phase of the liquid crystal in the film becomes isotropic varies depending on the material, this temperature is usually equal to or more than the first phase transition temperature and falls in a range of the first phase transition temperature plus approximately 50° C. (e.g., between 100° C. and 150° C.). Thus, the film is heated to a temperature in this range. When the temperature of the film exceeds this range, such a trouble as decomposition or thermal polymerization of the liquid crystal in the film occurs.

On the other hand, when the temperature of the film is lower than the above-described range, the phase transition to the isotropic phase may not occur in some portions of the liquid crystal in the film.

When the liquid crystalline composition to be applied to the substrate contains a solvent, the above-described heating step can be conducted as a drying step for removing the solvent. It is, of course, possible to separately carry out, prior to the heating step, the drying step for removing the solvent.

Thereafter, the film that has been heated to the temperature equal to or more than the first phase transition temperature to cause the phase transition to the isotropic phase is cooled to a temperature equal to or less than the first phase transition temperature of the liquid crystal, with a gas blown on the film from a predetermined direction. By doing so, the isotropic phase of the liquid crystal in the film is converted into the cholesteric phase, and, at the same time, the directions of the helical axes in liquid crystal domains in the film are tilted along a stream of the gas blown, whereby the liquid crystal is oriented in such a manner that the mean direction of the directions of helical axes (the main direction of helical axes) in the liquid crystal domains in the film is tilted at a predetermined angle relative to the direction of the normal to the film plane (step 103).

In the above step, if aligning power has been imparted in advance to the surface of the substrate, all of the directions of the helical axes in the liquid crystal domains in the film are tilted, relative to the substrate plane, in the same direction, so that a film for specular reflection is obtained. On the other hand, if aligning power has not been imparted to the surface of the substrate, although the directions of the helical axes in the liquid crystal domains in the film vary, they are tilted, as a whole, in a specific direction, i.e., the main direction of the helical axes, and, as a result, a film for diffuse-reflection is obtained.

The phenomenon that occurs in the above-described step for orientation is a kind of shear orientation, and it is possible to freely control the tilt of the directions of helical axes in the liquid crystal domains in the film, by adjusting the rate, direction, angle, etc. of the gas (air stream) that is blown on the film. Further, if the rate, direction, angle, etc. of the gas (air stream) are adjusted section by section, in the substrate plane, it is possible to form, in one plane of the finally formed cholesteric liquid crystalline reflective layer, a plurality of sections that are different in the main direction of helical axes.

In the above-described temperature-lowering process, the temperature of the film is lowered to a temperature equal to or less than the first phase transition temperature (e.g., 90° C.) of the liquid crystal. The liquid crystal in the film therefore becomes cholesteric, and, owing to a self-accumulating action of the liquid crystalline molecules themselves, director of the liquid crystalline molecules continuously rotates in the direction of the film thickness to form a helical structure.

After converting the isotropic phase of the liquid crystal in the film into the cholesteric phase thereof and orienting the liquid crystal in such a manner that the mean direction of the directions of helical axes (the main direction of helical axes) in the liquid crystal domains in the film is tilted relative to the direction of the normal to the film plane, radiation such as ultraviolet light is applied to the liquid crystal in the film to polymerize the liquid crystal, with the phase of the liquid crystal in the film maintained cholesteric, thereby the state of orientation of the liquid crystal in the film is fixed as it is (step 104).

In the above process, as long as the temperature of the film is equal to or less than the first phase transition temperature of the liquid crystal, the state of orientation of the liquid crystal in the film is maintained as it is even when the blowing of the gas is stopped. Therefore, the liquid crystal in the film is polymerized and is thus fixed, with the phase of the liquid crystal in the film maintained cholesteric.

In the above-described step for polymerization, electron beams, ultraviolet light, or the like may be properly used as the radiation according to the conditions. Generally, it is preferable to use ultraviolet light from the viewpoints of the simplicity of apparatus, and so forth, and a wavelength of the ultraviolet light herein useful is from 250 to 400 nm. Although the amount of the radiation to be applied is properly selected depending on the material of the film, the radiation may be applied in any amount as long as the film can be cured to such a degree that the film can retain its own form (a semi-cured state included). Moreover, the radiation may be applied in any atmosphere including an atmosphere of an inert gas ($N_2$ or Ar) or of air.

By carrying out a series of the above-described steps (steps 101 to 104), there can be produced a projection screen 10 comprising a cholesteric liquid crystalline reflective layer 11 composed of a single reflective layer, as shown in FIG. 3. Further, if a series of the steps described above are repeated, there can be produced a projection screen 10 comprising a cholesteric liquid crystalline reflective layer composed of a plurality of reflective layers. This makes it possible to produce, for example, a projection screen 10 composed of a partial selective reflection layer 11R for selectively reflecting a light in the wave range for red (R), a partial selective reflection layer 11G for selectively reflecting a light in the wave range for green (G), and a partial selective reflection layer 11B for selectively reflecting a light in the wave range for blue (B) that are successively laminated to the substrate 12 in the order stated, as shown in FIG. 5. Moreover, it becomes possible to produce a projection screen 10 in which each partial selective reflection layer for selectively reflecting each color (e.g., a partial selective reflection layer 11B for selectively reflecting blue) is composed of a plurality of reflective layers (e.g., reflective layers 11B-1 and 11B-2), as shown in FIGS. 6A and 6B.

Thus, according to this embodiment, in the oriented cholesteric liquid crystalline reflective layer 11 made from a polymerizable cholesteric liquid crystal, the mean direction of the directions L, of helical axes (the main direction $L_2$ of helical axes) in each liquid crystal domain 20 of the liquid crystalline structure is tilted at a predetermined angle relative to the direction of the normal to the layer plane, so that the cholesteric liquid crystalline reflective layer 11 can give, to an optical element, optical properties that are anisotropic relative to the normal to the element plane. Therefore, even when such a cholesteric liquid crystalline reflective layer 11 is incorporated, as a reflecting element, in a projection screen 10, it causes cholesteric reflection and interfacial reflection in different directions, so that the cholesteric reflection light (emergent light 32) that is the image light (incident light 31) projected from the projector 30 and reflected by cholesteric reflection (emergent light 32), and the interfacial reflection light 33 that is the image light (incident light 31) projected from the projector 30 and reflected by interfacial reflection are never overlapped. For this reason, it becomes possible to avoid the mirroring of the light source, which is caused by the interfacial reflection light 33, even if the surface of the cholesteric liquid crystalline reflective layer 11 is kept smooth without being matted, and a viewer can thus observe a bright image with high visibility.

Further, according to this embodiment, if the main direction $L_2$ of helical axes in the liquid crystalline structure of the cholesteric liquid crystalline reflective layer 11 is, with consideration for the position of the projection screen 10, controlled in such a manner that the reflected light is directed to a specified direction, the projection screen 10 can improve distribution of brightness over its entire face, and can therefore display an image sharply. Specifically, in the ordinary way of use wherein a projector 30 is placed near a specific point of observation, when a projection screen 10 that displays an image by reflecting an image light (incident light 31) is observed at a point of observation at which the image light is seen most brightly, the light 33 reflected by interfacial reflection is also seen bright, which makes the image visibility lower. Further, the brightness on parts of the projection screen 10 that are in oblique directions relative to the specific point of observation (e.g., the outer peripheral parts) becomes lower than the brightness on the part of the projection screen 10 that is right opposite to the specific point of observation (e.g., the center part). However, according to this embodiment of the invention, since the main direction $L_2$ of helical axes in the liquid crystalline structure of the cholesteric liquid crystalline reflective layer 11 is, with consideration for the position of the projection screen 10, controlled in such a manner that the reflected light is directed to a specific direction, the light 33 reflected by interfacial reflection, which may decrease the visibility of the image observed even at the specific point of observation at which the image is seen most brightly, travels in the direction different from the direction in which the image light (incident light 31) is reflected by cholesteric reflection. Moreover, it is possible to increase the intensity of light that is emitted, toward the specific point of observation, from the parts of the projection screen 10 that are in oblique directions relative to the specific point of observation, such as the outer peripheral parts of the projection screen 10. The projection screen 10 can therefore improve distribution of brightness over its face and can thus display an image sharply. Furthermore, since the main direction $L_2$ of helical axes in the liquid crystalline structure of the cholesteric liquid crystalline reflective layer 11 is, with consideration for the position of the projection screen 10, controlled in such a manner that the reflected light is directed to a specific direction, it is possible to decrease distortion of state of polarization of the light on the outer peripheral parts of the cholesteric liquid crystalline reflective layer 11, on which the image light (incident light 31) is obliquely incident (the parts that are in oblique directions relative to the specific point of observation). It is therefore possible to effectively prevent the entire surface of the projection screen 10 from being affected by color shift, decrease in reflection efficiency, and so forth.

Furthermore, according to this embodiment, since the cholesteric liquid crystalline reflective layer 11 selectively reflects only a specific polarized-light component (e.g., right-handed circularly polarized light), it is possible to make the cholesteric liquid crystalline reflective layer 11 reflect only approximately 50% of unpolarized environmental light, such as extraneous light and illumination light, incident on this layer. It is, therefore, possible to nearly double the image contrast by decreasing the brightness on the dark-color-displaying part such as a black-displaying part to almost half, while maintaining the brightness on the bright-color-displaying part such as a white-displaying part. In this case, if the image light to be projected is made to mainly contain the same polarized-light component (e.g., right-handed circularly polarized light) as that which the cholesteric liquid crystalline reflective layer 11 selectively reflects, the cholesteric liquid crystalline reflective layer 11 can reflect nearly 100% of the image light projected on this layer, and the image light can thus be efficiently reflected.

In the above-described embodiment, a retardation layer 15 may be provided on the incident-side surface of the cholesteric liquid crystalline reflective layer 11 in the projection screen 10, as shown in FIG. 5. If the retardation layer 15 is so provided, it becomes possible to eliminate the distortion of polarization of the image light that obliquely enters the cholesteric liquid crystalline reflective layer 11, thereby increasing the efficiency of the cholesteric liquid crystalline reflective layer 11 in separating the polarized light. Further, in this case, a projector is not required to emit the specific polarized light that the cholesteric liquid crystalline reflective layer 11 selectively reflects; the purpose can be fulfilled as long as the state of polarization of the light that has passed through the retardation layer 15 corresponds to that of the light which the cholesteric liquid crystalline reflective layer 11 selectively reflects.

In the above-described embodiment, a variety of functional layers may be provided on the incident-side surface of the cholesteric liquid crystalline reflective layer 11 in the projection screen 10. Various types of functional layers are useful, and a hard coat layer (HC layer), a matte layer (AG layer), an antireflection layer (AR layer), an ultraviolet-light-absorbing layer (UV-absorbing layer), and an antistatic layer (AS layer) may be used, for example. The hard coat layer (HC layer) is for protecting the surface of the projection screen 10 from scratching or staining. The matte layer (AG layer) is a layer (anti-glaring layer) for preventing, by the irregularities present on its surface, the surface of the projection screen 10 from causing interfacial reflection of light. The antireflection layer (AR layer) is for preventing, by making use of thin film interference or the like, the surface of the projection screen 10 from causing interfacial reflection of light. The ultraviolet-light-absorbing layer (UV-absorbing layer) is for absorbing ultraviolet light component that is contained in the light incident on the projection screen and that causes yellowing of the liquid crystalline composition. The antistatic layer (AS layer) is for removing static electricity that the projection screen 10 generates. It is desirable that these functional layers be less hazy and highly transparent. Besides, functional layers that have low refractive indices and that do not alter the state of polarization of light that passes through the layers are preferred. However, in a case wherein a functional layer is made to serve also as such a retardation 15 as is shown in FIG. 5, it may be birefringent. A haze value of 1 to 30 is enough for the matte layer if the layer is used to merely prevent the mirroring of a landscape. On the other hand, if the matte layer is used to prevent the mirroring of a projector, it is desirable that the haze value of the matte layer be 40 or more, preferably 60 or more.

Although the above embodiment has been described with reference to the case wherein the cholesteric liquid crystalline reflective layer 11 serving as an anisotropic optical element is incorporated in the projection screen 10, the cholesteric liquid crystalline reflective layer 11 may be incorporated in cards, posters, decorative components such as decorative components for furniture or electric appliances, and the like.

In this case, the main direction $L_2$ of helical axes in the liquid crystalline structure of the cholesteric liquid crystalline reflective layer 11 is not necessarily the same over the entire layer face, unlike in the projection screen 10 according to the above-described embodiment. The cholesteric liquid crystalline reflective layer 11 may have, on the planar face of its layer plane, a predetermined anisotropic pattern that is produced by making the main directions $L_2$ of helical axes in a plurality of sections of the planar face of the layer plane different from each other.

In order for the planar face of the cholesteric crystalline reflective layer 11 to have a plurality of sections that are different in the main direction $L_2$ of helical axes, the following anisotropic patterning may be conducted. Namely, in the steps 102 and 103 in a production method shown in FIG. 7, a single-layer film that has been heated to cause a phase transition to isotropic phase is cooled, while blowing a gas (air stream) on the film under predetermined conditions (velocity, direction, angle, etc.), thereby making the entire planar face of the film anisotropic (a state that the main direction of helical axes in the film is tilted at a predetermined angle relative to the direction of the normal to the film plane). Thereafter, in the step 104, the film is irradiated selectively through a mask or the like in order to cure some portions of the planar face of the film plane, leaving the remaining portions uncured. This film is subjected again to the steps 102 to 104 under conditions (especially, conditions relating to the gas (air stream) blowing) different from the above-described ones, in order to make the uncured portions of the film isotropic. The entire planar-face of the film plane is then made anisotropic. For the selective irradiation that is conducted in the step 104, not only the method using a mask, but also other methods such as partial patterning with a laser beam are useful.

Figure 8A:
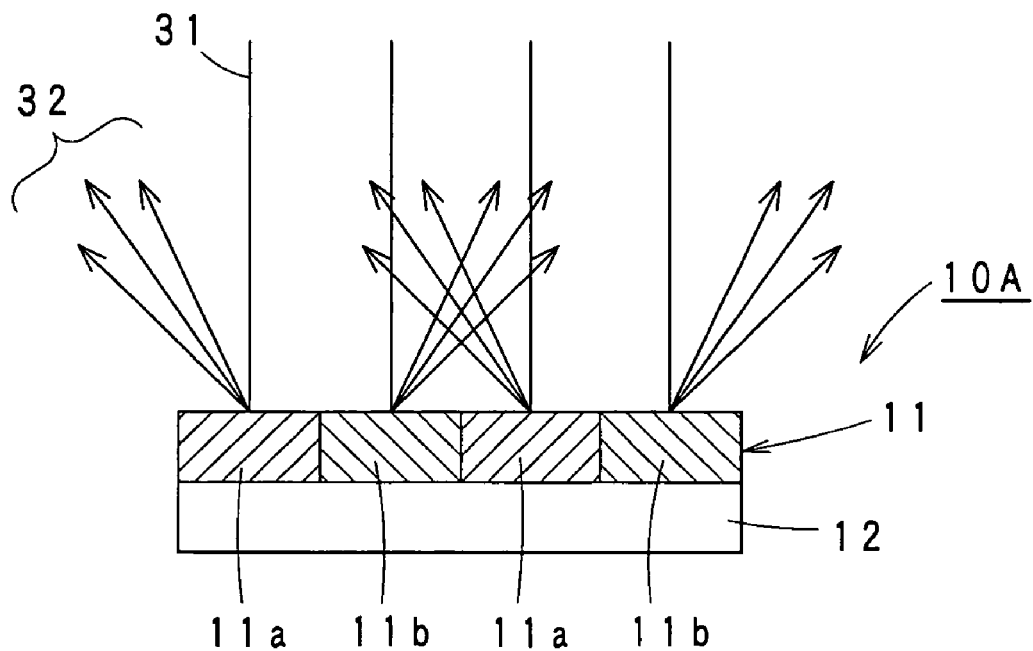
FIG. 8A is a diagrammatic sectional view showing a decorative component using an anisotropic optical element according to an embodiment of the present invention.
Figure 8B:
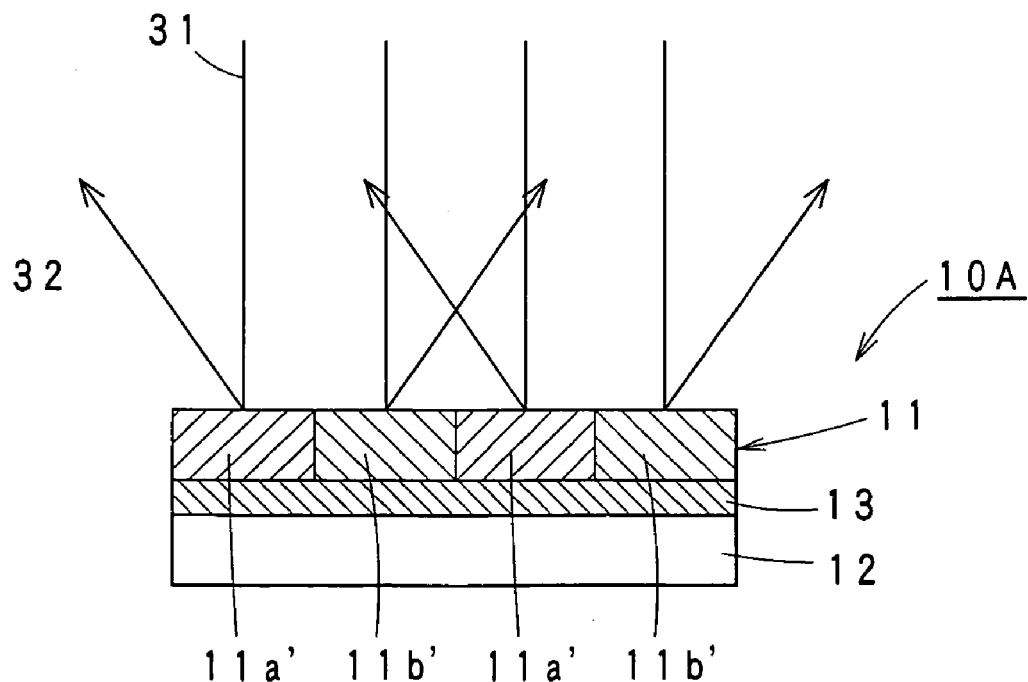
FIG. 8B is a diagrammatic sectional view showing another decorative component using an anisotropic optical element according to an embodiment of the present invention.

If the velocity, direction, angle, and so forth of the gas (air stream) to be blown on the cholesteric liquid crystalline reflective layer 11 are controlled, section by section, as described above, there is obtained a decorative component 10A comprising a cholesteric liquid crystalline reflective layer 11 whose layer plane has a planar face consisting of a plurality of sections (anisotropic sections) 11a, 11b, at least two of which are different in the main directions $L_2$ of helical axes, as shown in FIG. 8A or 8B.

FIG. 8A shows a case wherein the surface of a substrate 12, to which a liquid crystal for forming the cholesteric liquid crystalline reflective layer 11 is applied, has no aligning power, and the sections 11a, 11b of the cholesteric liquid crystalline reflective layer 11 exhibit self-diffusing properties. On the other hand, FIG. 8B shows a case wherein the surface of a substrate 12 is provided with an alignment film 13 to have aligning power, and the sections (anisotropic sections) 11a', 11b' of the cholesteric liquid crystalline reflective layer 11 exhibit specular-diffusing properties. An incident light 31 entering a decorative component 10A comprising such a cholesteric liquid crystalline reflective layer 11 as is shown in FIG. 8A or 8B undergoes cholesteric reflection, and the cholesteric reflection lights (emergent lights 32) reflected from the sections 11a, 11b of the cholesteric liquid crystalline reflective layer 11 travel in different directions depending on the respective sections (11a or 11b) from which the lights have been reflected.

Figure 9:
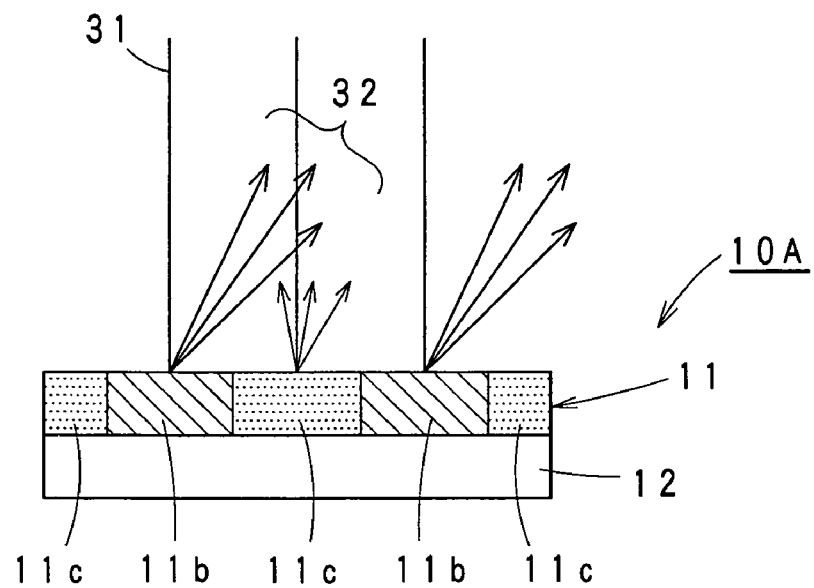
FIG. 9 is a diagrammatic sectional view showing a modification of the decorative component using an anisotropic optical element according to an embodiment of the present invention.

FIGS. 8A and 8B show the case where the sections 11a, 11b, 11a', and 11b' of the cholesteric liquid crystalline reflective layers 11 are anisotropic (a state that the main direction $L_2$ of helical axes in the liquid crystalline structure of the cholesteric liquid crystalline reflective layer 11 is tilted at a predetermined angle relative to the direction of the normal to the layer plane). The cholesteric liquid crystalline reflective layer 11 of the invention is not limited to this type, and some planar sections of the layer plane of the cholesteric liquid crystalline reflective layer 11 (in this case, section(s) 11c) may be isotropic, as shown in FIG. 9. An incident light 31 entering a decorative component 10A comprising such a cholesteric liquid crystalline reflective layer 11 as is shown in FIG. 9 undergoes cholesteric reflection, and the cholesteric reflection light (emergent light 32) reflected from the section(s) (anisotropic section) 11b of the cholesteric liquid crystalline reflective layer 11 travels in the direction different from that in which light reflected by interfacial reflection travels, while another incident light 31 entering the section(s) (isotropic section) 11c is reflected in the same direction as that in which the light reflected by interfacial reflection travels.

Further, in such a decorative component 10A, the cholesteric liquid crystalline reflective layer 11 may not be necessarily a fully formed layer, unlike the projection screen 10 according to the above-described embodiment. A predetermined configurational pattern may be produced in the planar face of the layer plane of the cholesteric liquid crystalline reflective layer 11 by removing portions of the layer that correspond to specified areas of the planar face of the layer plane.

In such a case, the following patterning method may be conducted in order to remove portions of the cholesteric liquid crystalline reflective layer 11 that correspond to specified areas of the planar face of the layer plane. Namely, in the steps 102 and 103 in the production method shown in FIG. 7, after making the entire planar face of the film anisotropic (a state that the main direction of helical axes in the film is tilted at a predetermined angle relative to the direction of the normal to the film plane), the film is, in the step 104, irradiated selectively through a mask or the like, in order to cure some portions of the film, leaving the remaining portions of the film uncured. This film is immersed in an organic solvent, and the uncured portions of the film are thus dissolved in the solvent for removal. To remove the uncured portions of the film, there can be used not only the method wherein, by immersing the film in an organic solvent, the liquid crystal is dissolved in the solvent, but also a method wherein the film is removed by peeling, a method wherein the pattern is transferred to another substrate, a method wherein the liquid crystalline polymer is decomposed by applying a laser beam, and so forth.

Figure 10:
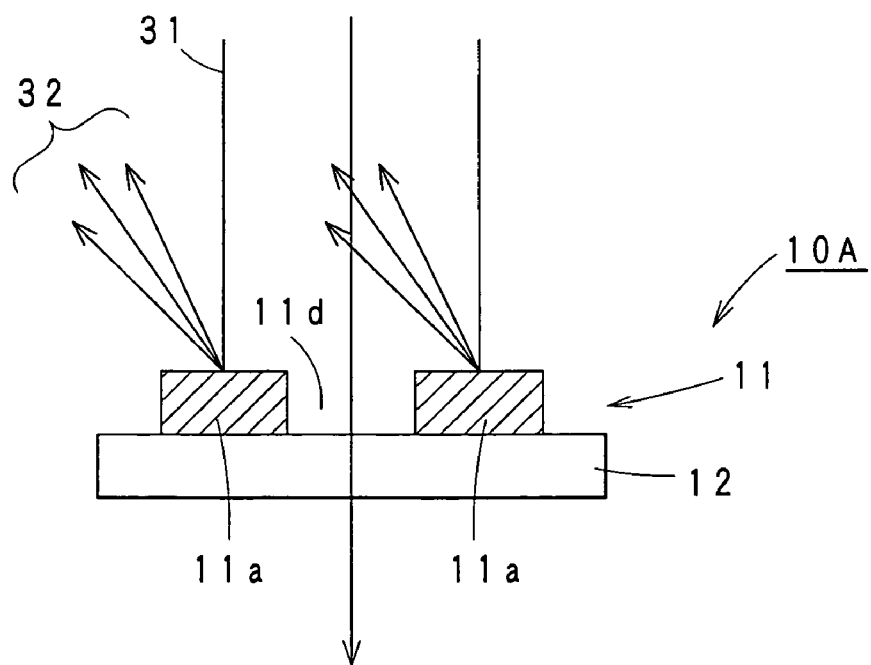
FIG. 10 is a diagrammatic sectional view showing another modification of the decorative component using an anisotropic optical element according to an embodiment of the present invention.

When the portions of the cholesteric liquid crystalline reflective layer 11 that correspond to the specified areas of the planar face of the layer plane (in this case, portions that correspond to opening section(s) 11d) are removed, leaving the remaining portions of the layer (in this case, section(s) 11a), there can be obtained a decorative component 10A comprising the cholesteric liquid crystalline reflective layer(s) 11 in a predetermined configuration pattern wherein only some sections of the cholesteric liquid crystalline reflective layer 11 (in this case, the section(s) 11a) are remaining, as shown in FIG. 10. An Incident light 31 entering a decorative component 10A comprising such a cholesteric liquid crystalline reflective layer 11 as is shown in FIG. 10 undergoes cholesteric reflection, and the cholesteric reflection light (emergent light 32) reflected from the section(s) 11a of the cholesteric liquid crystalline reflective layer 11 travels in the direction different from that in which the light reflected by interfacial reflection travels, while another incident light 31 entering the opening section(s) 11d is transmitted as it is.

Although the cholesteric liquid crystalline reflective layers 11 shown in FIGS. 8A, 8B and 9 are respectively composed of single layers having predetermined anisotropic patterns, the cholesteric liquid crystalline reflective layer 11 of the invention is not limited to this type, and may also be composed of a plurality of reflective layers 11-1, 11-2, 11-3 having predetermined anisotropic patterns, as shown in FIG. 11. In the latter case, the anisotropic patterns of the reflective layers 11-1, 11-2, 11-3 constituting the cholesteric liquid crystalline reflective layer 11 may be either the same or different. The reflective layers 11-1, 11-2, 11-3 may selectively reflect light in different wave ranges (colors). Further, when each reflective layer 11-1, 11-2, 11-3 is composed of a plurality of sections, the respective sections of each reflective layer may selectively reflect light in different wave ranges (colors). Furthermore, the respective reflective layers 11-1, 11-2, 11-3 may selectively reflect light polarized in different directions (right-handed circularly polarized light or left-handed circularly polarized light).

Although the cholesteric liquid crystalline reflective layer 11 shown in FIG. 10 is composed of a single layer having a predetermined configurational pattern, it may also be composed of a plurality of reflective layers having predetermined configurational patterns. In the latter case, the configurational patterns of the reflective layers constituting the cholesteric liquid crystalline reflective layer 11 may be either the same or different. The reflective layers may selectively reflect light in different wave ranges (colors). Further, when each reflective layer is composed of a plurality of sections, the respective sections of each reflective layer may selectively reflect light in different wave ranges (colors). Furthermore, the respective reflective layers may selectively reflect light polarized in different directions (right-handed circularly polarized light or left-handed circularly polarized light).

In addition, it is possible to obtain a cholesteric liquid crystalline reflective layer 11 having more complicated optical properties by a combination use of a layer 11-1 having a specific anisotropic pattern and a layer 11-3' having a specific configurational pattern, as shown in FIG. 12A or 12B. In FIG. 12A, concavities in the layer 11-3' having a specific configurational pattern are filled with a layer 11-2' having optical properties that are uniform over the entire face of the layer plane. In FIG. 12B, concavities in the layer 11-3' having a specific configurational pattern are filled with an overcoat layer 14, and on the overcoat layer 14 is formed a layer 11-2 having optical properties that are uniform over the entire face of the layer plane.

Figure 13:
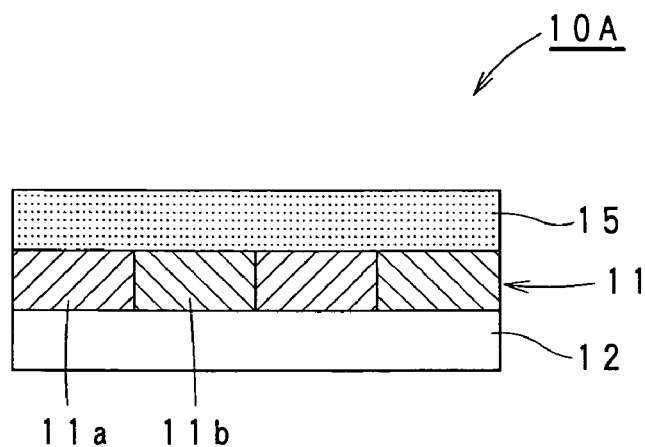
FIG. 13 is a diagrammatic sectional view showing a still further modification of the decorative component using an anisotropic optical element according to an embodiment of the present invention.

A retardation layer 15 may be provided on the incident-side surface of the cholesteric liquid crystalline reflective layer 11 in the above-described decorative component 10A, as shown in FIG. 13. If the retardation layer 15 is so provided, it becomes possible to eliminate the distortion of polarization of the image light that obliquely enters the cholesteric liquid crystalline reflective layer 11, thereby increasing the efficiency of the cholesteric liquid crystalline reflective layer 11 in separating the polarized light. Further, in this case, a projector is not required to emit specific polarized light corresponding to the polarized light that the cholesteric liquid crystalline reflective layer 11 selectively reflects; the purpose can be fulfilled as long as the state of polarization of the light that has passed through the retardation layer 15 corresponds to that of the light which the cholesteric liquid crystalline reflective layer 11 selectively reflects.

Figure 14A:
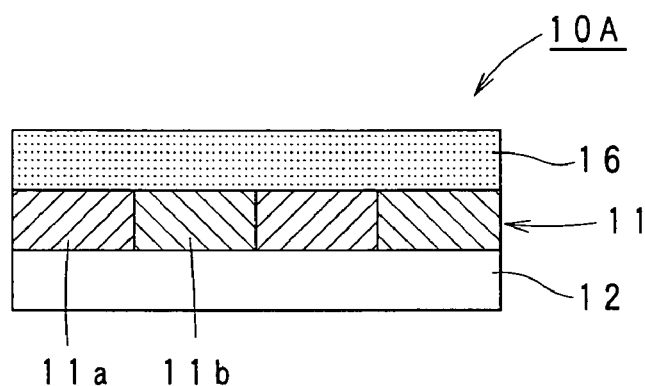
FIGS. 14A and 14B are diagrammatic sectional views showing modifications of the decorative component using an anisotropic optical element according to an embodiment of the present invention.
Figure 14B:
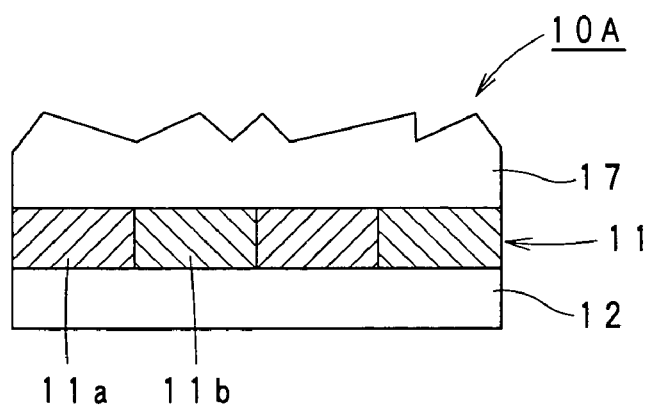

Further, a variety of functional layers may be provided on the incident-side surface of the cholesteric liquid crystalline reflective layer 11 in the decorative component 10A. Various types of functional layers are useful, and a hard coat layer (HC layer) 16 shown in FIG. 14A, and a matte layer (AG layer) 17 shown in FIG. 14B may be used, for example. Besides, an antireflection layer (AR layer), an ultraviolet-light-absorbing layer (UV-absorbing layer), an antistatic layer (AS layer), and the like may be used herein. The hard coat layer (HC layer) 16 is for protecting the surface of the decorative component 10A from scratching or staining. The matte layer (AG layer) 17 is a layer (anti-glaring layer) for preventing, by the irregularities present on its surface, the surface of the decorative component 10A from causing interfacial reflection of light. The antireflection layer (AR layer) is for preventing, by making use of thin film interference or the like, the surface of the decorative component 10A from causing interfacial reflection of light. The ultraviolet-light-absorbing layer (UV-absorbing layer) is for absorbing ultraviolet light component that is contained in the light entering the decorative component 10A and that causes yellowing of the liquid crystalline composition. The antistatic layer (AS layer) is for removing static electricity that the decorative component 10A generates. It is desirable that these functional layers be less hazy and highly transparent. Besides, functional layers that have low refractive indices and that do not alter the state of polarization of light that passes through the layers are preferred. However, in a case wherein a functional layer is made to serve also as such a retardation 15 as is shown in FIG. 13, it may be birefringent. A haze value of 1 to 30 is enough for the matte layer 17 shown in FIG. 14B, if the layer is used to merely prevent the mirroring of a landscape. On the other hand, if the matte layer is used to prevent the mirroring of a projector, it is desirable that the haze value of the matte layer be 40 or more, preferably 60 or more.

Figure 15A:
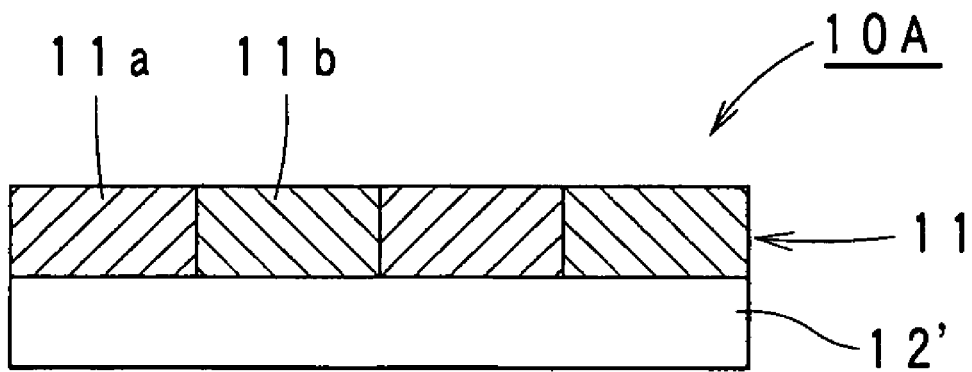
FIGS. 15A and 15B are diagrammatic sectional views showing modifications of the decorative component using an anisotropic optical element according to an embodiment of the present invention.
Figure 15B:
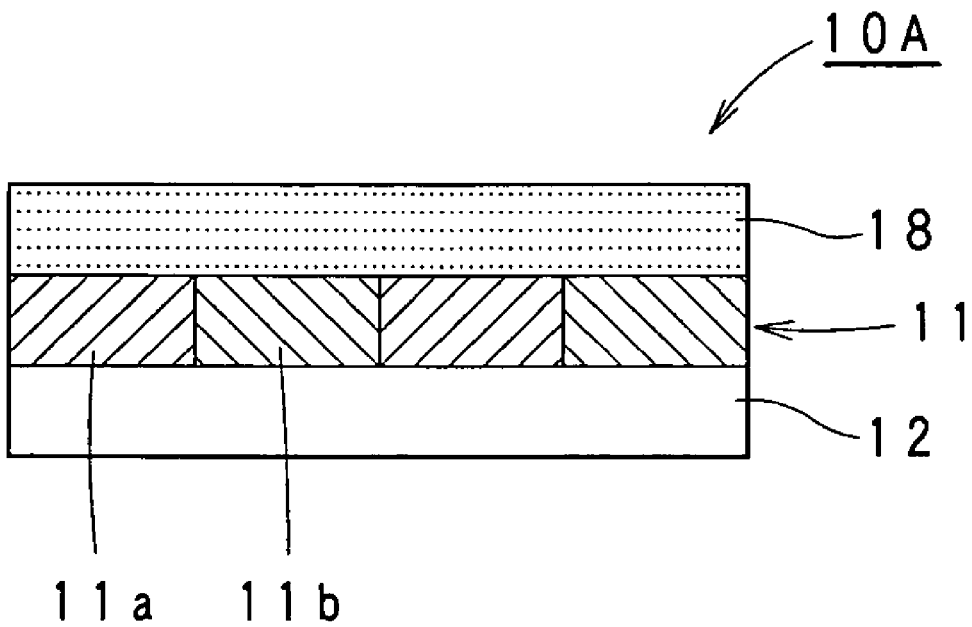

In this case, an absorptive layer 18 in any color may be provided on the incident-side surface of the cholesteric liquid crystalline reflective layer 11 in the decorative component 10A, as shown in FIG. 15B. When the absorptive layer 18 is provided in this way, the light that the cholesteric liquid crystalline reflective layer 11 selectively reflects assumes the desired color, so that the decorative component 10A becomes more decorative. The absorptive layer 18 may be formed not only on the incident-side surface of the cholesteric liquid crystalline reflective layer 11 but also in any other position. Further, the absorptive layer 18 may have any configurational pattern (a variety of figures, characteristics, etc.). Furthermore, the absorptive layer 18 may be composed of a laminate of a plurality of layers.

In the above-described decorative component 10A, it is preferable to use, as the substrate for supporting the cholesteric liquid crystalline reflective layer 11, a substrate 12' that reflects light other than the light the cholesteric liquid crystalline reflective layer 11 selectively reflects, as shown in FIG. 15A. When such a substrate 12' is used, the light other than the light that the cholesteric liquid crystalline reflective layer 11 selectively reflects can be reflected in a direction different from that in which the light selectively reflected from the cholesteric liquid crystalline reflective layer 11 travels. The decorative component 10A having the substrate 12' can thus have special visual effect.

EXAMPLES

Specific examples of the above-described embodiments will be given below.

Example 1

A cholesteric liquid crystal solution having a selective reflection center wavelength of 550 nm was prepared by dissolving, in cyclohexanone, a monomer-containing liquid crystal obtained by adding a chiral agent (3% by weight) and a surface-active agent (0.05% by weight) to an ultraviolet-curing nematic liquid crystal (97% by weight), a main agent.

The cholesteric liquid crystal solution prepared in the above-described manner was applied, by die coating, to a 100 mm×100 mm glass substrate (thickness: 1 mm) coated with an alignment film.

This substrate was heated in an oven at 80° C. for 90 seconds, for drying, thereby obtaining a film containing no solvent.

The film-coated glass substrate was taken out from the oven, and was heated on a hot plate to 120° C. in order to make the phase of the liquid crystal in the film isotropic. Subsequently, while a warm air at 20° C. is blown from a fan on the surface of the film at an angle of 45° at a wind velocity of 10 m/second, the film-coated glass substrate was removed from the hot plate and was cooled to 25° C., room temperature.

Thereafter, 10 mW/cm² of ultraviolet light of 365 nm was applied to the film in an atmosphere of nitrogen for 1 minute in order to cure the film, thereby obtaining an anisotropic optical element having a cholesteric liquid crystalline reflective layer with a selective reflection center wavelength of 550 nm (a reflecting element that specularly reflects a green light). It was confirmed that the main direction of helical axes in the cholesteric liquid crystalline reflective layer in this anisotropic optical element was tilted at an angle of 10° relative to the direction of the normal to the substrate.

Example 2

The cholesteric liquid crystal solution prepared in Example 1 was applied to a 100 mm×100 mm glass substrate (thickness: 1 mm) by die coating.

This substrate was then heated in an oven at 80° C. for 90 seconds, for drying, thereby obtaining a film containing no solvent.

The film-coated glass substrate was taken from of the oven, and was heated on a hot plate to 120° C. in order to make the phase of the liquid crystal in the film isotropic. Subsequently, the film-coated glass substrate was transferred onto another hot plate at 80° C., and was cooled to 80° C. while a warm air at 20° C. is blown from a fan on the surface of the film at an angle of 40° at a wind velocity of 10 m/second. Then, this film-coated glass substrate was removed from the hot plate at 80° C. and was cooled to 25° C., room temperature.

Thereafter, 10 mW/cm² of ultraviolet light of 365 nm was applied to the film in an atmosphere of nitrogen for 1 minute in order to cure the film, thereby obtaining an anisotropic optical element having a cholesteric liquid crystalline reflective layer with a selective reflection center wavelength of 550 nm (a reflecting element that diffuse-reflects a green light). It was confirmed that the main direction of helical axes in the cholesteric liquid crystalline reflective layer in this anisotropic optical element was tilted at an angle of 10° relative to the direction of the normal to the substrate.

Subsequently, the cholesteric liquid crystalline reflective layer in the anisotropic optical element obtained in the above-described manner was heated again to 120° C., thereby making the phase of the uncured cholesteric liquid crystal portion isotropic. This cholesteric liquid crystalline reflective layer was then cooled to 80° C., while a warm air at 20° C. is blown from a fan from a direction different from that in the above step, on the surface of the cholesteric liquid crystalline reflective layer at an angle of 40° at a wind velocity of 10 m/second. The glass substrate having the cholesteric liquid crystalline reflective layer was removed from the hot plate at 80° C. and was further cooled to 25° C., room temperature.

Thereafter, 10 mW/cm² of ultraviolet light of 365 nm was applied to the film in an atmosphere of nitrogen for 1 minute to cure the cholesteric liquid crystalline reflective layer, thereby obtaining an anisotropic optical element having the cholesteric liquid crystalline reflective layer with a selective reflection center wavelength of 550 nm (a reflecting element that diffuse-reflects green light), the layer surface having sectionally varied anisotropism with respect to diffusing properties.

Example 3

A first cholesteric liquid crystal solution having a selective reflection center wavelength of 550 nm was firstly prepared by dissolving, in cyclohexanone, a monomer-containing liquid crystal obtained by adding a chiral agent (3% by weight) and a surface-active agent (0.15% by weight) to an ultraviolet-curing nematic liquid crystal (97% by weight), a main agent.

The first cholesteric liquid crystal solution prepared in the above-described manner was applied to a 100 mm×100 mm glass substrate (thickness: 1 mm) by die coating.

This substrate was heated in an oven at 80° C. for 90 seconds, for drying, thereby obtaining a film containing no solvent.

The film was heated to 120° C. in order to make the phase of the liquid crystal in the film isotropic. Subsequently, while a warm air at 80° C. is blown from a fan on the surface of the film at an angle of 45° at a wind velocity of 10 m/second, the temperature of the film was lowered to 80° C.

Thereafter, 10 mW/cm² of ultraviolet light of 365 nm was applied to the film in an atmosphere of nitrogen for 1 minute in order to cure the film, thereby obtaining a first partial selective reflection layer with a selective reflection center wavelength of 550 nm.

Similarly, a second cholesteric liquid crystal solution was applied directly to the first partial selective reflection layer and was subjected to the above-described drying, orienting, and curing treatments. Thus, a second partial selective reflection layer with a selective reflection center wavelength of 610 nm was obtained. Herein, the second cholesteric liquid crystal solution was prepared in the same manner as that in which the first cholesteric liquid crystal solution was prepared, provided that the nematic liquid crystal and the chiral agent were mixed in such a proportion that the resulting layer had a selective reflection center wavelength of 610 nm.

Similarly, a third cholesteric liquid crystal solution was applied directly to the second partial selective reflection layer and was subjected to the above-described drying, orienting, and curing treatments. Thus, a third partial selective reflection layer with a selective reflection center wavelength of 440 nm was obtained. Herein, the third cholesteric liquid crystal solution was prepared in the same manner as that in which the first cholesteric liquid crystal solution was prepared, provided that the nematic liquid crystal and the chiral agent were mixed in such a proportion that the resulting layer had a selective reflection center wavelength of 440 nm.

Thus, there was obtained an anisotropic optical element comprising a cholesteric liquid crystalline reflective layer composed of the first partial selective reflection layer (thickness: 4 μm) selectively reflecting a light in a wave range for a green color (G) (light having a center wavelength at 550 nm), the second partial selective reflection layer (thickness: 5 μm) selectively reflecting a light in a wave range for a red color (R) (light having a center wavelength at 610 nm), and the third partial selective reflection layer (thickness: 3 μm) selectively reflecting a light in a wave range for a blue color (B) (light having a center wavelength at 440 nm) that were successively laminated in the order stated, the first partial selective reflection layer being on the substrate. The cholesteric liquid crystalline reflective layer in the anisotropic optical element obtained in the above-described manner had a liquid crystalline structure that was not in the state of planar orientation, and showed diffuse-reflecting properties. It was found that a main direction of helical axes in each partial selective reflection layer was tilted at an angle of 10° relative to the direction of the normal to the glass substrate, and that all of these tilts were in the same direction.

(Results of Evaluation)

A black pigment was applied to a back surface of the glass substrate of each one of the anisotropic optical elements of Examples 1, 2 and 3, and was then dried to form a light-shielding layer. The anisotropic optical elements with the light-shielding layers obtained in this manner were used as projection screens, and an image light emitted from a projector was projected on each projection screen. A liquid crystal projector (ELP-52 manufactured by Seiko Epson Corporation, Japan) was used as the projector.

Figure 16:
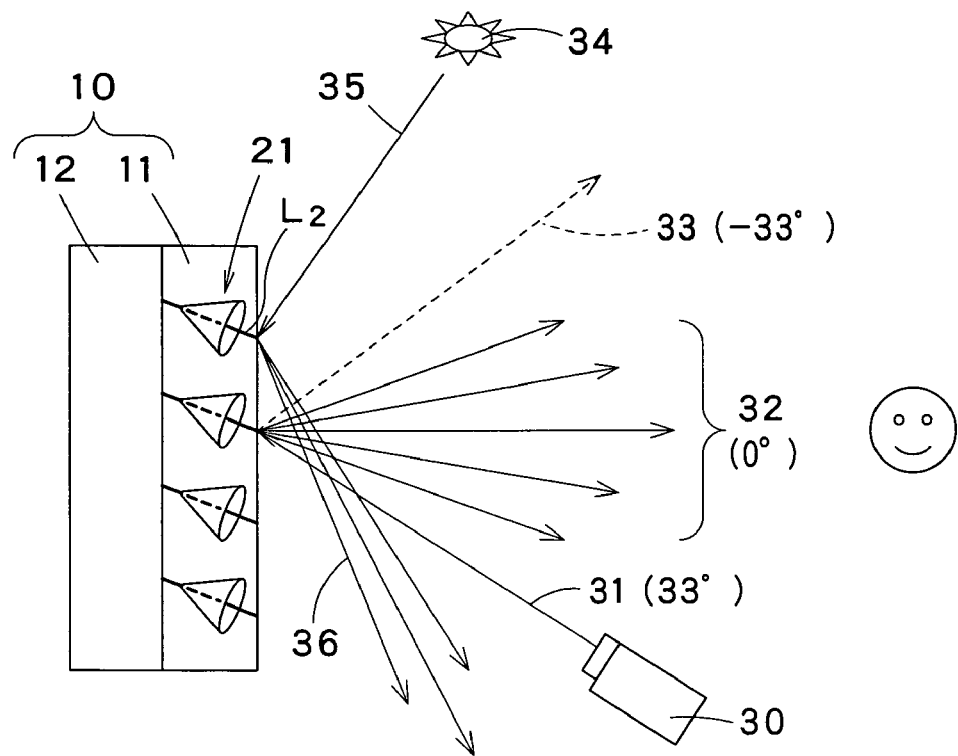
FIG. 16 is a view showing an arrangement of a projection system that is used to evaluate Examples of the present invention.

The projection screen and the projector were arranged in such a positional relationship as is shown in FIG. 16. Namely, the projection screen 10 was set vertically to a floor, as shown in FIG. 16; the height of the projection screen 10 was made 1.3 m above the floor; and the projector 30 was placed on the floor. An illumination light source (extraneous light source 34) was set in a space in which the projection screen 10 and the projector 30 were placed. An extraneous light 35 from the light source 34, illuminating the projection screen 10, was reflected from the projection screen 10 to emerge as a reflected light 36.

The projector 30 was set at such an angle that the image light (incident light 31) was incident on a center portion of the projection screen 10 at an angle of 33°, the angle of a line vertical to the projection screen plane being taken as 0°. On the other hand, the main direction of helical axes in the liquid crystal domains contained in the anisotropic optical element (cholesteric liquid crystalline reflective layer 11) in each projection screen 10 was tilted at an angle of 10° relative to the direction of the normal to the glass substrate (substrate 12), and the projection screen 10 was set so that this tilt faced down (to the projector 30 side).

Figure 17:
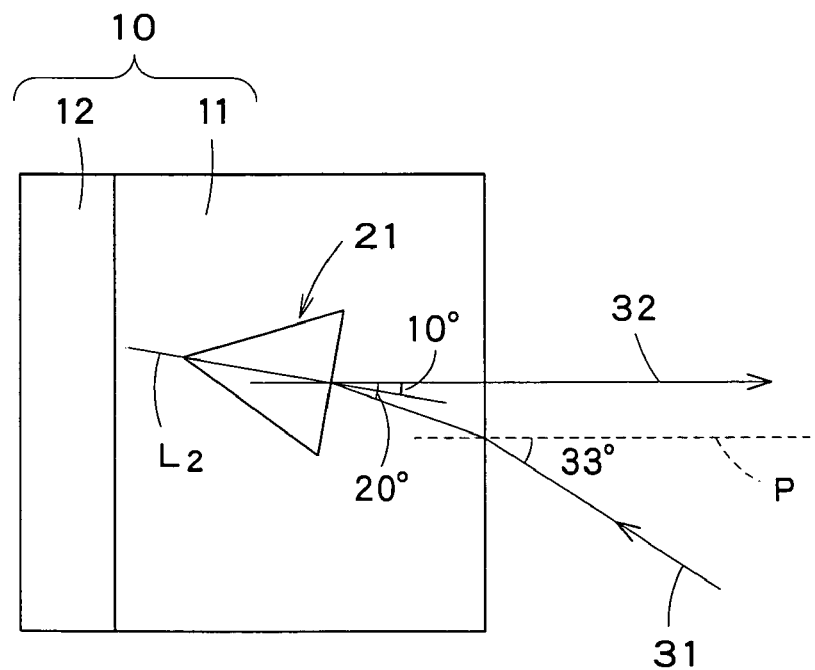
FIG. 17 is a view for explaining the optimum value for the tilt of the main direction of helical axes in cholesteric liquid crystalline reflective layers in Examples of the present invention.

When the projection screen 10 and the projector 30 are placed as described above, to view the projection screen 10, from the front thereof is best for a viewer, because the direction vertical to the screen face is the direction from which the image light can be viewed most brightly (the direction of the reflected light 32). This fact will be explained in more detail with reference to FIG. 17. Assuming that the refractive index of the liquid crystal contained in the cholesteric liquid crystalline reflective layer 11 in the projection screen 10 is 1.58 and that the refractive index of the environment (air) in which the projection screen 10 is placed is 1.0, an image light that is projected on the projection screen 10 (cholesteric liquid crystalline reflective layer 11) at an angle of incidence of 33° enters the projection screen 10 (cholesteric liquid crystalline reflective layer 11) at an angle of 20° (=arcsin ((sin(30°)/1.58))) according to Snell's law. For this reason, if the tilt of the main direction of helical axes in the liquid crystalline structure of the cholesteric liquid crystalline reflective layer 11 is 20/2=10°, the reflected light 32 can travel vertically to the projection screen 10.

Under the above conditions, an image light (a still image including white and black areas) was projected on the projection screen from the projector, and was visually observed from the front of the projection screen, at a point near the projector, with the room light on.

As a result, the image on each one of the projection screens of Examples 1, 2, and 3 was sharp and bright, and none of the projection screens caused mirroring of the light source. Further, the image was observed after placing a polarizing filter in order to make the room light (an extraneous light-source) mainly emit left-handed circularly polarized light, which the projection screens do not reflect. Then, the image on each projection screen was sharper, and exhibited higher contrast.

The invention claimed is:

1. An anisotropic optical element having optical properties that are anisotropic with respect to a direction of a normal to an element plane, comprising:
   an oriented cholesteric liquid crystal layer made from a polymerizable cholesteric liquid crystal, formed to have a flat layer plane,
   a main direction of helical axes, defined as a mean direction of directions of helical axes in liquid crystal domains of the cholesteric liquid crystal layer, being tilted at a predetermined angle with respect to a direction of a normal to the layer plane,
   wherein directions of helical axes in liquid crystal domains of the cholesteric liquid crystal layer are varied relative to the main direction of helical axes within a predetermined range, so as to diffuse light that is selectively reflected.

2. The anisotropic optical element according to claim 1, wherein main directions of helical axes in at least two of a plurality of sections of the layer plane of the cholesteric liquid crystal layer plane are made different from each other so that the layer plane has a predetermined anisotropic pattern.

3. The anisotropic optical element according to claim 1, wherein portions of the cholesteric liquid crystal layer that correspond to specified areas of the layer plane are removed so that the layer plane has a predetermined configurational pattern.

4. The anisotropic optical element according to claim 1, wherein the cholesteric liquid crystal layer is composed of a laminate of a plurality of constituent layers.

5. The anisotropic optical element according to claim 4, wherein main directions of helical axes in at least two of the plurality of constituent layers are different from each other.

6. The anisotropic optical element according to claim 4, wherein main directions of helical axes in at least two of the plurality of constituent layers are identical.

7. The anisotropic optical element according to claim 4, wherein main directions of helical axes in at least two of a plurality of sections of the layer plane of each constituent layer of the cholesteric liquid crystal layer are made different from each other so that the layer plane has a predetermined anisotropic pattern.

8. The anisotropic optical element according to claim 7, wherein the anisotropic patterns of at least two of the plurality of constituent layers of the cholesteric liquid crystal layer are different from each other.

9. The anisotropic optical element according to claim 4, wherein portions of each constituent layer of the cholesteric liquid crystal layer that correspond to specified areas of the layer plane are removed so that the layer plane has a predetermined configurational pattern.

10. The anisotropic optical element according to claim 9, wherein the configurational patterns of at least two of the plurality of constituent layers of the cholesteric liquid crystal layer are different from each other.

11. A projection screen comprising an anisotropic optical element according to claim 1.

12. A decorative component comprising an anisotropic optical element according to claim 1.

* * * * *

UNITED STATES PATENT AND TRADEMARK OFFICE
CERTIFICATE OF CORRECTION

PATENT NO. : 7,583,341 B2
APPLICATION NO. : 11/414264
DATED : September 1, 2009
INVENTOR(S) : Masanori Umeya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Fourteenth Day of September, 2010

David J. Kappos
*Director of the United States Patent and Trademark Office*